US005112959A

United States Patent [19]

Miyamoto et al.

[11] Patent Number: 5,112,959

[45] Date of Patent: May 12, 1992

[54] POLYAZO DYE COMPOUNDS HAVING PLURAL VINYLSULFONE TYPE FIBER REACTIVE GROUPS IN ONE MOLECULE

[75] Inventors: Tetsuya Miyamoto, Takatsuki; Kazufumi Yokogawa, Minoo; Yutaka Kayane, Ikoma; Takashi Omura, Kobe; Takeshi Washimi, Toyonaka; Naoki Harada, Ibaraki; Kingo Akahori, Toyonaka, all of Japan

[73] Assignee: Sumitomo Chemical Company, Limited, Osaka, Japan

[21] Appl. No.: 526,708

[22] Filed: May 22, 1990

[30] Foreign Application Priority Data

| | | | |
|---|---|---|---|
| Jun. 1, 1989 | [JP] | Japan | 1-141856 |
| Jan. 12, 1990 | [JP] | Japan | 2-005226 |
| Jan. 18, 1990 | [JP] | Japan | 2-009962 |
| Feb. 16, 1990 | [JP] | Japan | 2-036891 |
| Feb. 16, 1990 | [JP] | Japan | 2-036894 |

[51] Int. Cl.[5] .................... C04B 62/513; D06P 1/382

[52] U.S. Cl. .................... 534/642; 534/637

[58] Field of Search .................... 534/637, 642

[56] References Cited

U.S. PATENT DOCUMENTS

| | | | |
|---|---|---|---|
| 4,622,390 | 11/1986 | Meininger et al. | 534/642 X |
| 4,645,832 | 2/1987 | Niwa et al. | 534/642 X |
| 4,698,421 | 10/1987 | Kayane et al. | 534/637 X |
| 4,730,038 | 3/1988 | Meininger et al. | 534/642 X |
| 4,839,469 | 6/1989 | Jager | 534/642 X |
| 4,845,203 | 7/1989 | Dietz et al. | 534/642 X |
| 4,908,436 | 3/1990 | Scheibli | 534/642 X |

FOREIGN PATENT DOCUMENTS

| | | | |
|---|---|---|---|
| 266774 | 5/1988 | European Pat. Off. | 534/642 |

OTHER PUBLICATIONS

Omura et al., Chemical Abstracts, vol. 108, No. 39576r (1988).

Bredereck et al, Chemical Abstracts, vol. 100, No. 69858m (1984).

Springer et al, Chemical Abstracts, vol. 107, No. 41687a (1987).

Scheibli, Chemical Abstracts, vol. 103, No. 1062494j (1985).

Tzikas, Chemical Abstracts, vol. 108, No. 7496y (1988).

*Primary Examiner*—Mary C. Lee

*Assistant Examiner*—Fiona T. Powers

*Attorney, Agent, or Firm*—Stevens, Davis, Miller & Mosher

[57] ABSTRACT

A polyazo compound of the following formula,

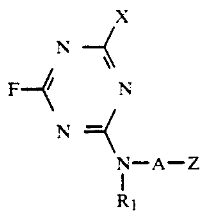

wherein A is phenylene, naphthylene or alkylene, X is $-NR_2R_3$, $-OR_4$ or $-SR_5$ in which $R_2$, $R_3$, $R_4$ and $R_5$ are each hydrogen, alkyl, phenyl, naphthylene or benzyl, Z is $-SO_2CH{=}CH_2$ or $-SO_2CH_2CH_2Z'$ in which Z' is a splittable group, $R_1$ is hydrogen or alkyl, and F is polyazo dye moiety carrying a fiber reactive group like that represented by Z. This compound is useful for the dyeing or printing of fiber materials to obtain a product dyed or printed in a color superior in various fastness properties with superior build-up property.

17 Claims, No Drawings

POLYAZO DYE COMPOUNDS HAVING PLURAL VINYLSULFONE TYPE FIBER REACTIVE GROUPS IN ONE MOLECULE

The present invention relates to polyazo compounds, a process for producing the same and a process for dyeing or printing fiber materials using the same. More specifically, the present invention relates to polyazo compounds having plural vinylsulfone type fiber reactive groups in one molecule, which are particularly useful for dyeing fiber materials including hydroxy group- and/or amide group-containing materials such as cellulose fibers, natural or synthetic polyamide fiber, polyurethane fibers, leather and mixed fibers thereof to produce dyed or printed products superior in light and wet fastness properties.

Polyazo fiber reactive dyes have been used for the dyeing or printing of fiber materials particularly those such as cellulose fibers. Of these, so-called vinylsulfone type fiber reactive dyes are prominent because of their superior dye performance.

In recent years, however, needs for the fiber reactive dyes became severe from technical and economical points of view, and the actual level of technology is not yet satisfactory to meet the high demands particularly with respect to the applicability for a specific dyeing technology and the fastness properties of dyed or printed products.

Fiber reactive dyes having a triazinyl group and plural vinylsulfone type fiber reactive groups in one molecule are disclosed, for example, in JP-A-63-118376. However, they are still insufficient in the dye performance and need improvement particularly with respect to solubility, build-up property and fastness properties.

The properties of solubility, build-up and fastness are critical aspects of the use of any compound for dyeing or printing fiber materials, and the build-up property of a compound is its most significant property in use in dyeing or printing fiber materials. A compound with a high build-up property permits the use of the lesser amounts of compound to achieve a better color depth as compared to a given amount of compound having poor build-up property. Moreover, a compound having a high build-up property can achieve a deeper color than compounds having poor build-up property even though such poor build-up compounds are used in greater amounts.

The present inventors have undertaken extensive studies to improve known fiber reactive dyes and to find a compound meeting the extensive needs of high level for fiber reactive dyes. As a result, it has been found that the object of the present invention can be accomplished by combining a specific chromophore with plural vinylsulfone type fiber reactive groups in a specific manner.

The present invention relates to a polyazo compound of the following formula (I),

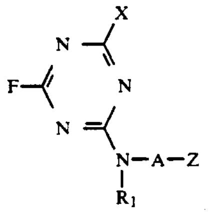

(I)

wherein A is unsubstituted or substituted phenylene, unsubstituted or substituted naphthylene or unsubstituted or substituted alkylene, X is $-NR_2R_3$, $-OR_4$ or $-SR_5$ in which $R_2$, $R_3$, $R_4$ and $R_5$ independently of one another are each hydrogen, unsubstituted or substituted alkyl, unsubstituted or substituted phenyl, unsubstituted or substituted naphthyl or unsubstituted or substituted benzyl, Z is $-SO_2CH{=}CH_2$ or $-SO_2CH_2CH_2Z'$ in which Z' is a group capable of being split by the action of an alkali, $R_1$ is hydrogen or unsubstituted or substituted alkyl, and F is a polyazo dye moiety selected from the group consisting of those represented by the following formulas (1), (2), (3) and (4) each in free acid form, the formula (1) being

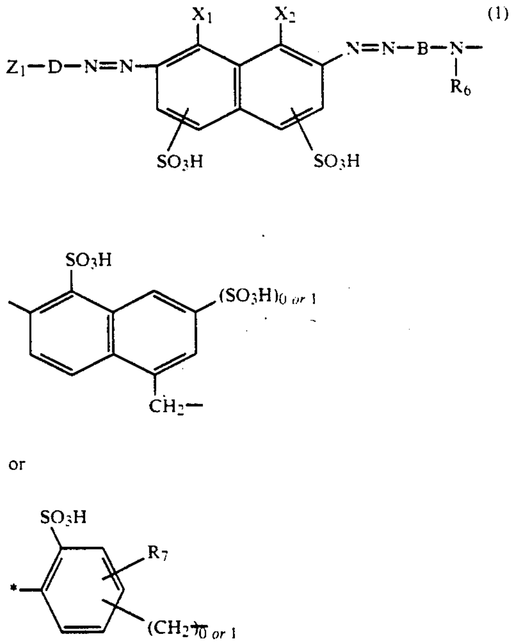

(1)

in which the asterisked linkage bonds to the azo group, and $R_7$ is hydrogen, methyl, methoxy or sulfo, D is unsubstituted or substituted phenylene or unsubstituted or substituted naphthylene, $R_6$ is hydrogen or unsubstituted or substituted alkyl, any one of $X_1$ and $X_2$ is $-NH_2$ and the other is $-OH$, and $Z_1$ is $-SO_2CH{=}CH_2$ or $-SO_2CH_2CH_2Z_1'$ in which $Z_1'$ is a group capable of being split by the action of an alkali, the formula (2) being

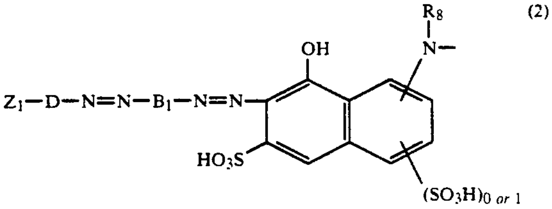

(2)

wherein D and $Z_1$ are as defined above, $R_8$ is hydrogen or unsubstituted or substituted alkyl, and $B_1$ is

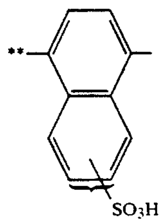

or

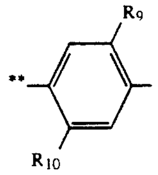

in which the linkage marked with ** bonds to the group —N=N—D. $R_9$ is hydrogen, alkyl, alkoxy or sulfo, and $R_{10}$ is hydrogen, halogen, alkyl, alkoxy, alkylsulfonylamino, acylamino or ureido, the formula (3) being $$Z_1—D—N=N—B_1—N=N—E—\overset{R_{11}}{\overset{|}{N}}— \quad (3)$$

wherein $B_1$, D and $Z_1$ are as defined above, $R_{11}$ is hydrogen or unsubstituted or substituted alkyl, E is

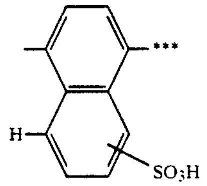

or

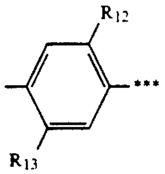

in which the linkage marked with *** bonds to the group $$—\overset{R_{11}}{\overset{|}{N}}—,$$

$R_{12}$ is hydrogen, alkyl, alkoxy or sulfo, and $R_{13}$ is hydrogen, halogen, alkyl, alkoxy, alkylsulfonylamino, acylamino or ureido, and the formula (4) being

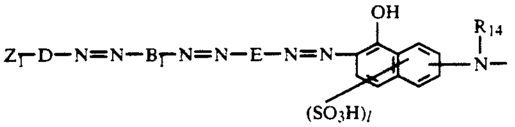
(4)

wherein $B_1$, D and $Z_1$ are as defined above, and E is as defined above, provided that the linkage marked with *** bonds to the azo group of

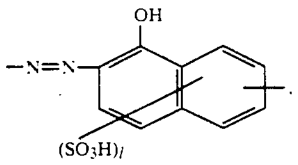

$R_{14}$ is hydrogen or unsubstituted or substituted alkyl, and l is 1 or 2, provided that $R_4$ is alkyl, phenyl, naphthyl or benzyl as defined above, when F is a polyazo dye moiety of the formula (1) or (2).

The present invention also provides a process for producing the polyazo compound of the formula (I), which comprises reacting a dye compound of the following formula (I), $$R—H \quad (II)$$

wherein F is as defined above, an amine compound of the following formula (III), $$H—\overset{R_1}{\overset{|}{N}}—A—Z \quad (III)$$

wherein $R_1$, A and Z are as defined above, and any one of compounds of the following formulas (IV) to (VI), $$HNR_2R_3 \quad (IV)$$

$$HOR_4 \quad (V)$$

$$HSR_5 \quad (VI)$$

wherein $R_2$, $R_3$, $R_4$ and $R_5$ are as defined above, with a 2,4,6-trihalogeno-s-triazine in any order.

The present invention further provides a process for dyeing or printing fiber materials, which comprises using the polyazo compound of the formula (I).

In the above formula (I), the phenylene represented by A is preferably one unsubstituted or substituted once or twice by methyl, ethyl, methoxy, ethoxy, chloro, bromo or sulfo, and the naphthylene represented thereby is preferably one unsubstituted or substituted by sulfo. Examples thereof are as follows:

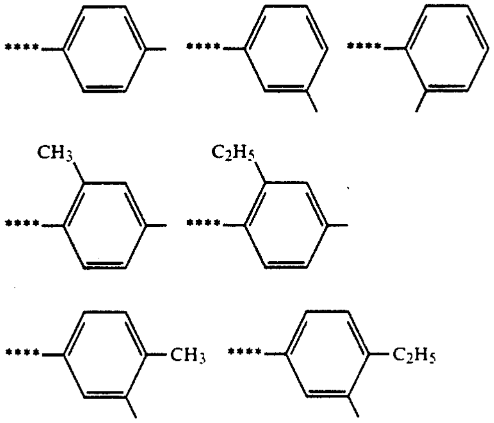

-continued

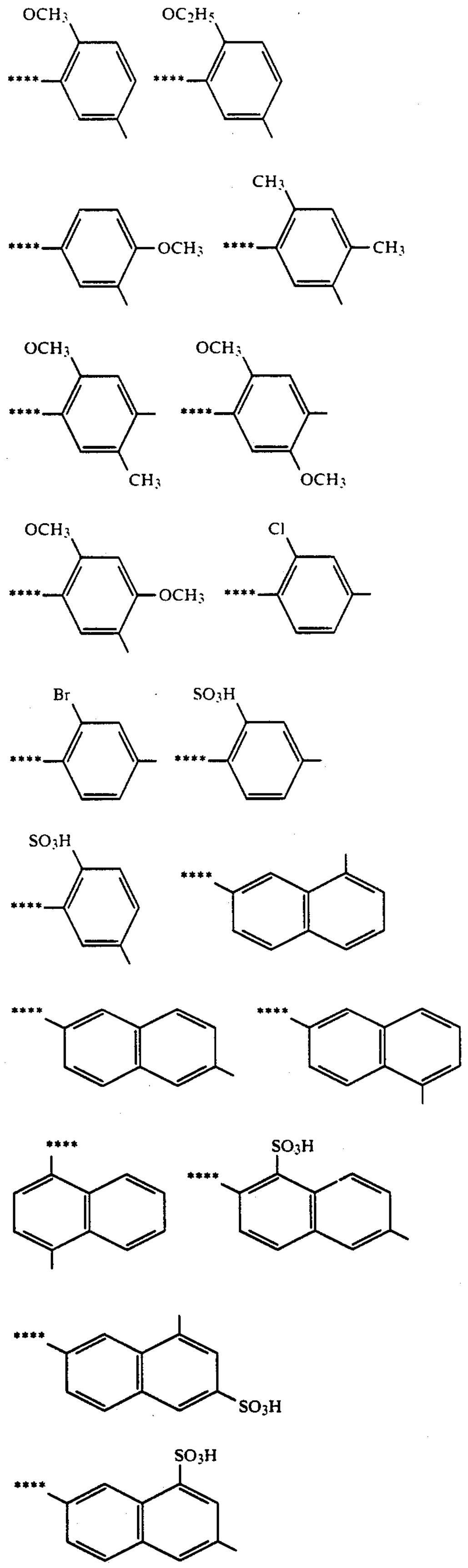

-continued

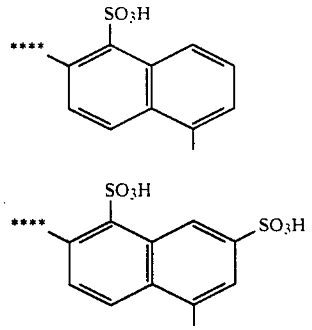

wherein the linkage marked with **** bonds to the group $$\underset{\displaystyle R_1}{\overset{}{-\underset{|}{N}-}},$$

The alkylene represented by A is preferably one represented by the following formula (a), (b), or (c), $$-CH_2\text{-}\underset{\displaystyle R'}{\underset{|}{(alk)}}\text{-}{*}{*}{*}{*} \qquad (a)$$

$$-(CH_2)_n-O-(CH_2)_m\text{-}{*}{*}{*}{*} \qquad (b)$$

$$\text{-}(alk')\text{-}\underset{\displaystyle R''}{\underset{|}{N}}\text{-}(alk')\text{-}{*}{*}{*}{*} \qquad (c)$$

wherein the linkage marked with **** is as defined above, alk is polymethylene having 1 to 6 carbon atoms or its branched isomer, R' is hydrogen, chloro, bromo, fluoro, hydroxy, sulfato, $C_1$–$C_4$ acyloxy, cyano, carboxy, $C_1$–$C_5$ alkoxycarbonyl or carbamoyl, R'' is hydrogen or $C_1$–$C_6$ alkyl, each alk' is independently polymethylene having 2 to 6 carbon atoms or its branched isomer, or each alk' is taken together with R'' to form a ring through methylene, m and n are each independently an integer of 1 to 6.

Preferable examples of the polymethylene or its isomer represented by alk are methylene, ethylene, methylmethylene, propylene and butylene. Examples of those represented by R'' are hydrogen, methyl, ethyl, propyl, isopropyl, butyl, isobutyl, sec-butyl, tert-butyl, pentyl and hexyl. Of these, hydrogen is preferred. Preferable examples of the polymethylene or its isomer represented by alk' are ethylene, propylene and butylene. Preferable integers as m and n are each independently 2, 3 or 4.

The alkyl represented by $R_1$, $R_6$, $R_8$, $R_{11}$ and $R_{14}$ is preferably one having 1 to 4 carbon atoms, and may be unsubstituted or substituted by hydroxy, cyano, $C_1$–$C_4$ alkoxy, halogen, carboxy, carbamoyl, $C_1$–$C_4$ alkoxycarbonyl, $C_1$–$C_4$ alkylcarbonyloxy, sulfo or sulfamoyl. Examples of those represented by them are hydrogen, methyl, ethyl, n-propyl, iso-propyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2- chloroethyl, 2-bromoethyl, 3-cloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl and the like.

Of these, particularly preferred are hydrogen, methyl and ethyl.

The alkyl represented by $R_2$ and $R_3$ is preferably one having 1 to 4 carbon atoms, and may be unsubstituted or substituted once or twice by $C_1$–$C_4$ alkoxy, sulfo, carboxy, hydroxy, chloro, phenyl or sulfato.

Of these, particularly preferred are methyl, ethyl, n-propyl, iso-propyl, n-butyl, iso-butyl, sec-butyl, $\beta$-hydroxyethyl, $\beta$-sulfatoethyl, $\beta$-sulfoethyl, $\beta$-methoxyethyl and $\beta$-carboxyethyl.

The phenyl represented by $R_2$ and $R_3$ is preferably one unsubstituted or substituted once or twice by $C_1$–$C_4$ alkyl, $C_1$–$C_4$ alkoxy, sulfo, carboxy, chloro and bromo.

Of these, particularly preferred are phenyl, 2-, 3- or 4-sulfophenyl, 2,4- or 2,5-disulfophenyl, 2-, 3- or 4-carboxyphenyl, 2-, 3- or 4-chlorophenyl, 2-, 3- or 4-methylphenyl and 2-, 3- or 4-methoxyphenyl.

The naphthyl represented by $R_2$ and $R_3$ is preferably one unsubstituted or substituted once, twice or three times by hydroxy, carboxy, sulfo, $C_1$–$C_4$ alkyl, $C_1$–$C_4$ alkoxy or chloro.

Of these, particularly preferred are 2-, 3-, 4-, 5-, 6-, 7- or 8-sulfo-1-naphthyl, 1-, 5-, 6-, 7- or 8-sulfo-2-naphthyl, 1,5-, 5,7-, 6,8-, 4,8-, 4,7-, 3,8-, 4,6-, 3,7- or 3,6-disulfo-2-naphthyl, 4,6,8-, 2,4,7- or 3,6,8-trisulfo-1-naphthyl and 1,5,7-, 4,6,8- or 3,6,8-trisulfo-2-naphthyl.

The benzyl represented by $R_2$ and $R_3$ is preferably one unsubstituted or substituted once or twice by $C_1$–$C_4$ alkyl, $C_1$–$C_4$ alkoxy, sulfo or chloro.

Of these, particularly preferred are benzyl and 2-, 3- or 4-sulfobenzyl.

In the present invention, the case where any one of $R_2$ and $R_3$ is hydrogen, methyl or ethyl, and the other is phenyl unsubstituted or substituted by $C_1$–$C_4$ alkyl, $C_1$–$C_4$ alkoxy, sulfo, carboxy or halogen is particularly preferred from the viewpoint of dye performance.

Examples of a compound represented by the formula, $HNR_2R_3$, which is capable of forming the group $-NR_2R_3$ as X in the formula (I), are ammonia, aromatic amines and aliphatic amines, the aromatic amines including 1-aminobenzene, 1-amino-2-, 3- or 4-methylbenzene, 1-amino-3,4- or 3,5-dimethylbenzene, 1-amino-2-, 3- or 4-ethylbenzene, 1-amino-2-, 3-or 4-methoxybenzene, 1-amino-2, 3- or 4-ethoxybenzene, 1-amino-2-, 3- or 4-chlorobenzene, 3- or 4-aminophenylmethanesulfonic acid, 2-, 3- or 4-aminobenzenesulfonic acid, 3-methylaminobenzenesulfonic acid, 3-ethylaminobenzenesulfonic acid, 4-methylaminobenzenesulfonic acid, 4-ethylaminobenzenesulfonic acid, 5-aminobenzene-1,3-disulfonic acid, 6-aminobenzene-1,3-disulfonic acid, 6-aminobenzene-1,4-disulfonic acid, 4-aminobenzene-1,2-disulfonic acid, 4-amino-5-methylbenzene-1,2-disulfonic acid, 2-, 3- or 4-aminobenzoic acid, 5-aminobenzene-1,3-dicarboxylic acid, 5-amino-2-hydroxybenzenesulfonic acid, 4-amino-2-hydroxybenzenesulfonic acid, 5-amino-2-ethoxybenzenesulfonic acid, N-methylaminobenzene, N-ethylaminobenzene, 1-methylamino-3- or 4-methylbenzene, 1-methylamino-2-, 3- or 4-chlorobenzene, 1-ethylamino-2-, 3- or 4-chlorobenzene, 1-ethylamino-3- or 4-methylbenzene, 1-(2-$\beta$-hydroxyethyl)amino-3-methylbenzene, 3- or 4-methylaminobenzoic acid, 3- or 4-methylaminobenzenesulfonic acid, 2-aminonaphthalene-1-sulfonic acid, 4-aminonaphthalene-1-sulfonic acid, 5-aminonaphthalene-1-sulfonic acid, 6-aminonaphthalene-1-sulfonic acid, 7-aminonaphthalene-1-sulfonic acid, 8-aminonaphthalene 1-sulfonic acid, 1-aminonaphthalene-2-sulfonic acid, 4-aminonaphthalene-2-sulfonic acid, 5-aminonaphthalene-2-sulfonic acid, 6-aminonaphthalene-2-sulfonic acid, 7-aminonaphthalene-2-sulfonic acid, 7-methylaminonaphthalene-2-sulfonic acid, 7-ethylaminonaphthalene-2-sulfonic acid, 7-butylaminonaphthalene-2-sulfonic acid, 7-isobutylaminonaphthalene-2-sulfonic acid, 8-aminonaphthalene-2-sulfonic acid, 4-aminonaphthalene-1,3-disulfonic acid, 5-aminonaphthalene-1,3-disulfonic acid, 6-aminonaphthalene-1,3-disulfonic acid, 7-aminonaphthalene-1,3-disulfonic acid, 8-aminonaphthalene-1,3-disulfonic acid, 2-aminonaphthalene-1,5-disulfonic acid, 3-aminonaphthalene-1,5-disulfonic acid, 4-aminonaphthalene-1,5-disulfonic acid, 4-aminonaphthalene-1,6-disulfonic acid, 8-aminonaphthalene-1,6-disulfonic acid, 4-aminonaphthalene-1,7-disulfonic acid, 3-aminonaphthalene-2,6-disulfonic acid, 4-aminonaphthalene-2,6-disulfonic acid, 3-aminonaphthalene-2,7-disulfonic acid, 4-aminonaphthalene-2,7-disulfonic acid, 6-aminonaphthalene-1,3,5-trisulfonic acid, 7-aminonaphthalene-1,3,5-trisulfonic acid, 4-aminonaphthalene-1,3,6-trisulfonic acid, 7-aminonaphthalene-1,3,6-trisulfonic acid, 8-aminonaphthalene-1,3,6-trisulfonic acid and 4-aminonaphthalene-1,3,7-trisulfonic acid, and the aliphatic amines including methylamine, ethylamine, n-propylamine, isopropylamine, n-butylamine, isobutylamine, sec-butylamine, dimethylamine, diethylamine, methylethylamine, allylamine, 2-chloroethylamine, 2-methoxyethylamine, 2-aminoethanol, 2-methylaminoethanol, bis-(2-hydroxyethyl)amine, 2-acetylaminoethylamine, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfatoethylamine, aminoacetic acid, methylaminoacetic acid, $\epsilon$-aminocaproic acid, benzylamine, 2-, 3- or 4-chlorobenzylamine, 4-methylbenzylamine, N-methylbenzylamine, 2-, 3- or 4-sulfobenzylamine, 2-phenylethylamine, 1-phenylethylamine, and 1-phenyl-2-propylamine.

Of these, preferred are, for example, aniline, N-methylaniline, N-ethylaniline, 2-, 3- or 4-sulfoaniline, 2-, 3- or 4-chloroaniline, N-methyl-2-, 3- or 4-chloroaniline, N-ethyl-2-, 3- or 4-chloroaniline, 2-, 3- or 4-methylaniline, aniline-2,4- or 2,5-disulfonic acid, 3- or 4-methylaminobenzenesulfonic acid, 3- or 4-ethylaminobenzenesulfonic acid, 2-, 3- or 4-carboxyaniline, taurine, N-methyltaurine and mono- or diethanolamine.

The alkyl represented by $R_4$ and $R_5$ is preferably one having 1 to 4 carbon atoms, and may be unsubstituted or substituted once or twice by $C_1$–$C_4$ alkoxy, sulfo, carboxy, hydroxy, chloro, phenyl, cyano or sulfato.

Of these, preferred are, for example, methyl, ethyl, n-propyl, iso-propyl, n-butyl, iso-butyl, sec-butyl, β-hydroxyethyl, β-sulfatoethyl, β-sulfoethyl, β-methoxyethyl, β-ethoxyethyl, β-chloroethyl and β-carboxyethyl.

The phenyl represented by $R_4$ and $R_5$ is preferably one unsubstituted or substituted once or twice by $C_1$–$C_4$ alkyl, $C_1$–$C_4$ alkoxy, sulfo, carboxy, chloro or bromo.

Of these, preferred are, for example, phenyl, 2-, 3- or 4-sulfophenyl, 2,4- or 2,5-disulfophenyl, 2-, 3- or 4-chlorophenyl, 2-, 3- or 4-methylphenyl and 2-, 3- or 4-methoxyphenyl.

The naphthyl represented by $R_4$ and $R_5$ is preferably one unsubstituted or substituted once, twice or three times by hydroxy, carboxy, sulfo, $C_1$–$C_4$ alkyl, $C_1$–$C_4$ alkoxy or chloro. Of these, preferred are, for example, 2-, 3-, 4-, 5-, 6-, 7- or 8-sulfo-1-naphthyl, 1-, 5-, 6-, 7- or 8-sulfo-2-naphthyl, 1,5-, 5,7-, 6,8-, 4,8-, 4,7-, 3,8-, 4,6-, 3,7- or 3,6-disulfo-2-naphtyl, 4,6,8-, 2,4,7- or 3,6,8-trisulfo-1-naphthyl and 1,5,7-, 4,6,8- or 3,6,8-trisulfo-2-naphthyl.

The benzyl represented by $R_4$ and $R_5$ is preferably one unsubstituted or substituted once or twice by $C_1$–$C_4$ alkyl, $C_1$–$C_4$ alkoxy, sulfo or chloro.

Of these, preferred are, for example, benzyl and 2-, 3- or 4-sulfobenzyl.

Examples of a compound represented by the formula, $R_4OH$, which is capable of forming the group —$OR_4$ as X in the formula (I), are aromatic and aliphatic hydroxy compounds, the aromatic hydroxy compounds including phenol, 1-hydroxy-2-, 3- or 4-methylbenzene, 1-hydroxy-3,4- or 3,5-dimethylbenzene, 1-hydroxy-2-, 3- or 4-ethylbenzene, 1-hydroxy-2-, 3- or 4-methoxybenzene, 1-hydroxy-2-, 3- or 4-chlorobenzene, 3- or 4-hydroxyphenylmethanesulfonic acid, 3-hydroxybenzenesulfonic acid, 4-hydroxybenzenesulfonic acid, 5-hydroxybenzene-1,3-disulfonic acid, 6-hydroxybenzene-1,4-disulfonic acid, 4-hydroxybenzene-1,2-disulfonic acid, 4-hydroxy-5-methylbenzene-1,2-disulfonic acid, 3- or 4-hydroxybenzoic acid, 5-hydroxybenzene-1,3-dicarboxylic acid, 5-hydroxy-2-ethoxybenzenesulfonic acid, 2-hydroxynaphthalene-1-sulfonic acid, 4-hydroxynaphthalene-1-sulfonic acid, 5-hydroxynaphthalene-1-sulfonic acid, 6-hydroxynaphthalene-1-sulfonic acid, 7-hydroxynaphthalene-1-sulfonic acid, 8-hydroxynaphthalene-1-sulfonic acid, 1-hydroxynaphthalene-2-sulfonic acid, 4-hydroxynaphthalene-2-sulfonic acid, 5-hydroxynaphthalene-2-sulfonic acid, 6-hydroxynaphthalene-2-sulfonic acid, 7-hydroxynaphthalene-2-sulfonic acid, 8-hydroxynaphthalene-2-sulfonic acid, 4-hydroxynaphthalene-1,3-disulfonic acid, 5-hydroxynaphthalene-1,3-disulfonic acid, 6-hydroxynaphthalene-1,3-disulfonic acid, 7-hydroxynaphthalene-1,3-disulfonic acid, 8-hydroxynaphthalene-1,3-disulfonic acid, 2-hydroxynaphthalene-1,5-disulfonic acid, 3-hydroxynaphthalene-1,5-disulfonic acid, 4-hydroxynaphthalene-1,5-disulfonic acid, 4-hydroxynaphthalene-1,6-disulfonic acid, 8-hydroxynaphthalene-1,6-disulfonic acid, 4-hydroxynaphthalene-1,7-disulfonic acid, 3-hydroxynaphthalene-2,6-disulfonic acid, 4-hydroxynaphthalene-2,6-disulfonic acid, 3-hydroxynaphthalene-2,7-disulfonic acid, 4-hydroxynaphthalene-2,7-disulfonic acid, 6-hydroxynaphthalene-1,3,5-trisulfonic acid, 7-hydroxynaphthalene-1,3,5-trisulfonic acid, 4-hydroxynaphthalene-1,3,6-trisulfonic acid, 7-aminonaphthalene-1,3,5-trisulfonic acid, 8-aminonaphthalene-1,3,6-trisulfonic acid and 4-aminonaphthalene-1,3,7-trisulfonic acid, and the aliphatic hydroxy compounds including methanol, ethanol, n-propanol, iso-propanol, n-butanol, iso-butanol, sec-butanol, 2-chloroethanol, 2-methoxyethanol, 2-ethoxyethanol, 3-methoxypropanol, 3-ethoxypropanol, 2-hydroxyethanesulfonic acid, 3-hydroxy-1-propanesulfonic acid, 2-cyanoethanol, glycollic acid, 3-hydroxypropionic acid, benzyl alcohol, 2-, 3- or 4-chlorobenzyl alcohol, 4-methylbenzyl alcohol, 2-, 3- or 4-sulfobenzyl alcohol, 2-phenylethanol and 1-phenyl-2-propanol.

Examples of a compound represented by the formula, $R_5SH$, which is capable of forming the group —$SR_5$ as X in the formula (I) are those exemplified above for the compound of the formula $R_5OH$, provided that the hydroxy is replaced by mercapto.

The group capable of being split by the action of an alkali represented by Z' and $Z_1'$ includes, for example, sulfuric acid ester group, thiosulfuric acid ester group, phosphoric acid ester group, acetic acid ester group and halogen. Of these, the sulfuric acid ester group is preferred.

Examples of the group represented by B are

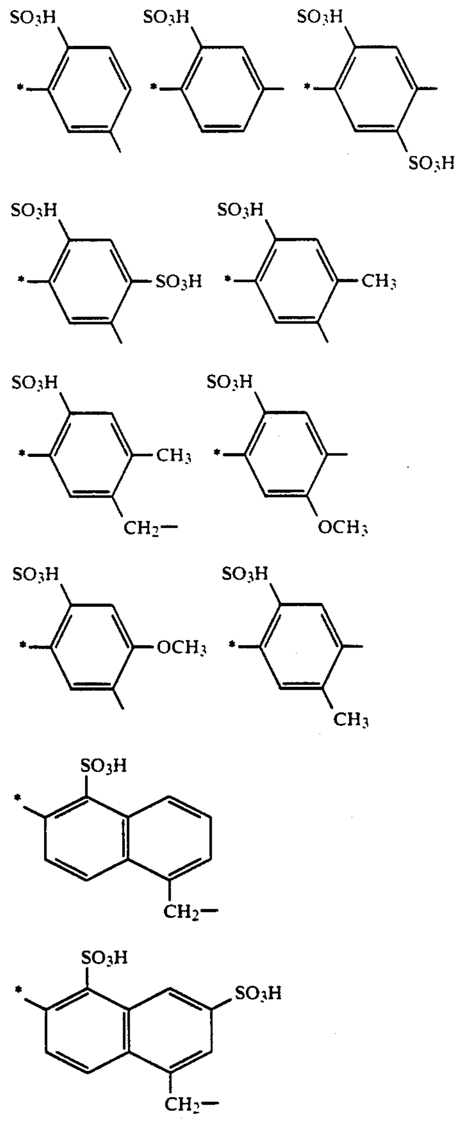

in which the asterisked linkage is as defined above.

Of these, preferred examples are

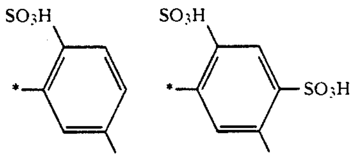

in which the asterisked linkage is as defined above.

The phenylene represented by D is preferably one unsubstituted or substituted once or twice by methyl, ethyl, methoxy, ethoxy, chloro, bromo or sulfo, and the naphthylene represented thereby is preferably one unsubstituted or substituted by sulfo. Examples thereof are

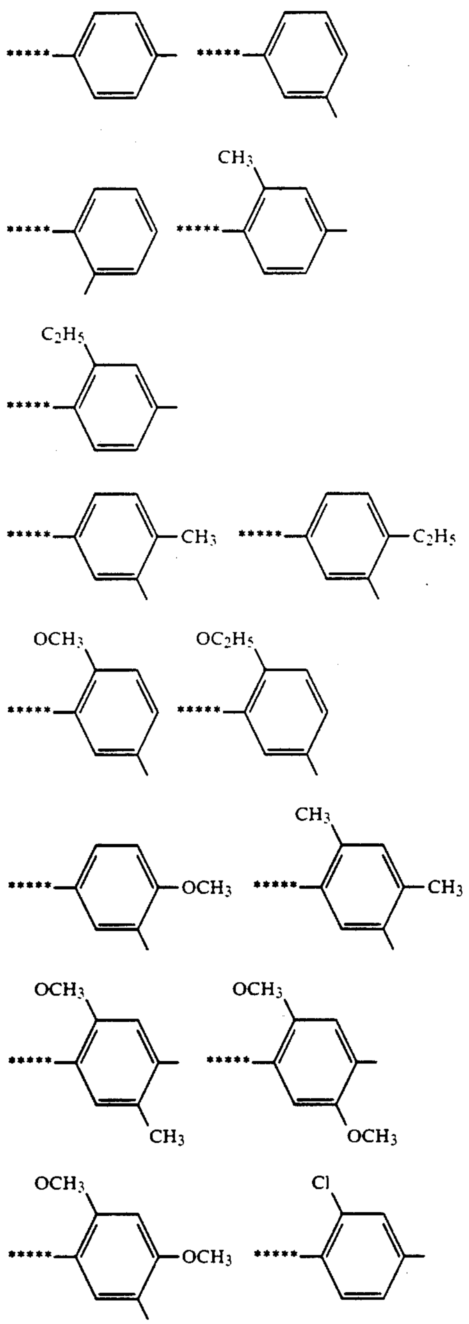

-continued

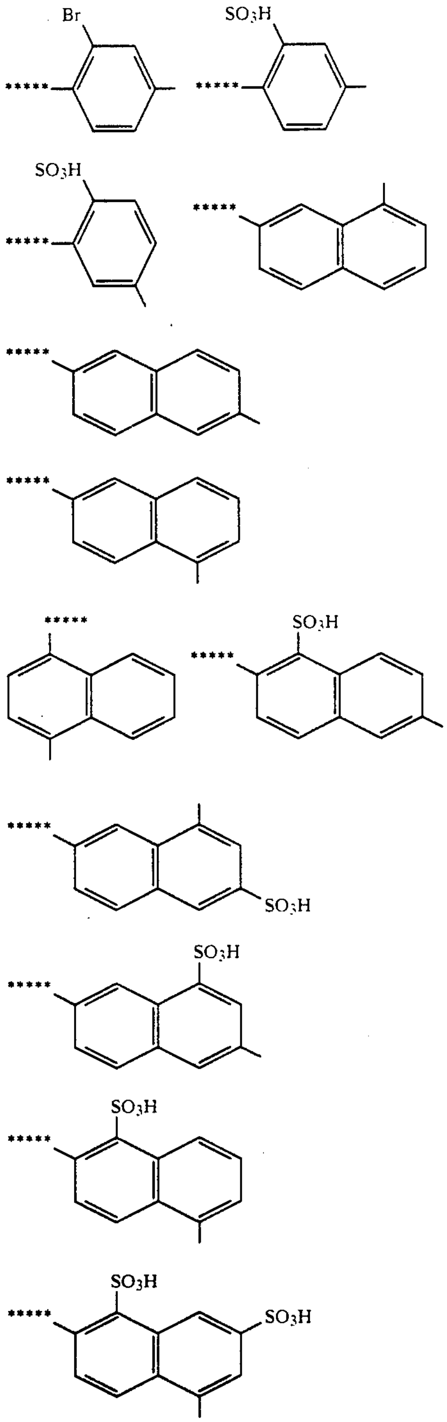

in which the linkage marked with ***** bonds to the azo group.

Of these, preferred are those carrying sulfo, such as, for example,

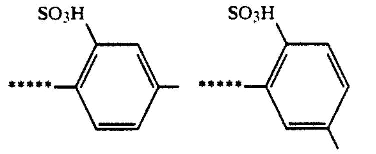

-continued

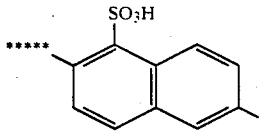

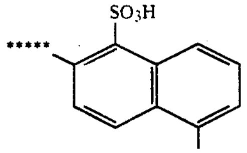

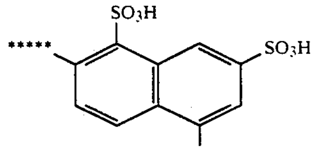

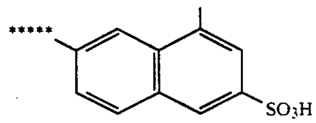

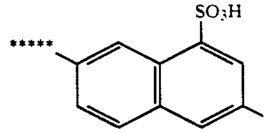

in which the linkage marked with ***** is as defined above.

In the present invention, the polyazo dye moiety represented by F comprises those represented by the above formulas (1) to (4).

Among those represented by the formula (1), preferred is a case where D is phenylene unsubstituted or substituted or naphthylene unsubstituted or substituted by sulfo, B is

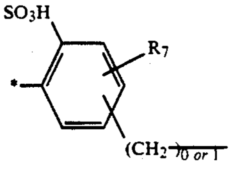

wherein $R_7$ and the asterisked linkage are as defined above, and $R_6$ is hydrogen. More specifically, preferred are those represented by the following formulas,

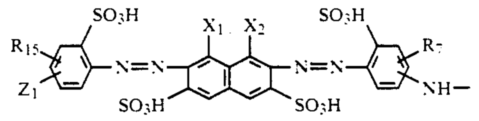

wherein $R_7$, $X_1$, $X_2$ and $Z_1$ are as defined above, and $R_{15}$ is hydrogen, $C_1$-$C_4$ alkyl, $C_1$-$C_4$ alkoxy, halogen or sulfo, and

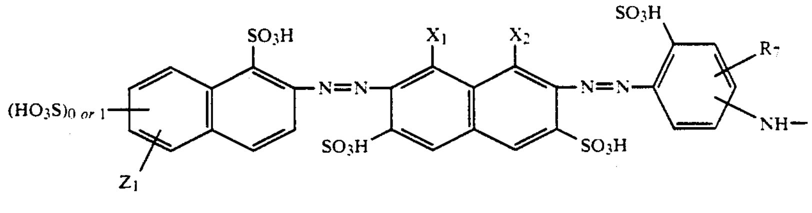

wherein $X_1$, $X_2$, $Z_1$ and $R_7$ are as defined above.

With respect to the polyazo dye moieties represented by the formulas (2) to (4), the alkyl, alkyl moiety in the alkylsulfonylamino and alkoxy, and acylmoiety in the acylamino represented by $R_9$, $R_{10}$, $R_{12}$ and/or $R_{13}$ are preferably Ones having 1 to 4 carbon atoms, such as methyl, ethyl, acetyl and propionyl, respectively, and the halogen represented by them is preferably chlorine.

More concretely speaking for the polyazo dye moieties represented by the formulas (1) to (4), examples of dye compounds constituting the dye moieties are given as follows.

Dye compounds represented by the following formula (1)' in the free acid form,

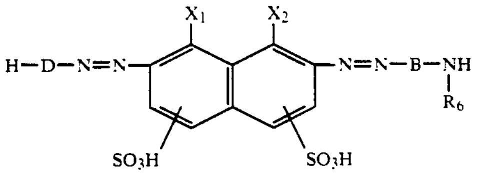

(1)' wherein D, $X_1$, $X_2$, B and $R_6$ are as defined above, include, for example, 1-hydroxy-2-(1'-sulfonaphth-2'-ylazo)-7-(5"-amino-2"-sulfophenylazo)-8-aminonaphthalene-3,6-disulfonic acid, 1-hydroxy-2-(1'-sulfonaphth-2'-ylazo)-7-(5"-amino-2"-sulfophenylazo)-8-aminonaphthalene-3,5-disulfonic acid, 1-hydroxy-2-(5'-amino-2'-sulfophenylazo)-7-(1"-sulfonaphth-2"-ylazo)-8-aminonaphthalene-3,6-disulfonic acid, 1-hydroxy-2-(5'-amino-2'-sulfophenylazo)-7-(1"-sulfonaphth-2"-ylazo)-8-aminonaphthalene-3,5-disulfonic acid, 1-hydroxy-2-(1'-sulfonaphth-2'-ylazo)-7-(5"-amino-2",4"-disulfophenylazo)-8-aminonaphthalene-3,6-disulfonic acid, 1-hydroxy-2 (1'-sulfonaphth-2'-ylazo)-7-(5"-amino-2",4"-disulfophenylazo)-8-aminonaphthalene-3,5-disulfonic acid, 1-hydroxy-2-(5'-amino-2',4'-disulfophenylazo)-7-(1"-sulfonaphth-2"-ylazo)-8-aminonaphthalene-3,6-disulfonic acid, 1-hydroxy-2-(5'-amino-2',4'-disulfophenylazo)-7-(1''-sulfonaphth-2''-ylazo)-8-aminonaphthalene-3,5-disulfonic acid, 1-hydroxy-2-(1',7'-disulfonaphth-2'-ylazo)-7-(5''-amino-2''-sulfophenylazo)-8-aminonaphthalene-3,6-disulfonic acid, 1-hydroxy-2-(5'-amino-2'-sulfophenylazo)-7-(1'',7''-disulfophenylnaphth-2''-ylazo)-8-aminonaphthalene-3,6-disulfonic acid, 1-hydroxy-2-(5'-amino-2'-sulfophenylazo)-7-(6''-sulfonaphth-2''-ylazo)-8-aminonaphthalene-3,6-disulfonic acid, 1-hydroxy-2-(5'-amino-2'-sulfophenylazo)-7-(8''-sulfonaphth-2''-ylazo)-8-aminonaphthalene-3,6-disulfonic acid, 1-hydroxy-2-(5'-amino-2'-sulfophenylazo)-7-(6''-sulfonaphth-2''-ylazo)-8-aminonaphthalene-3,5-disulfonic acid, 1-hydroxy-2-(1'-sulfonaphth-2'-ylazo)-7-(4''-amino-2''-sulfophenylazo)-8-aminonaphthalene-3,6-disulfonic acid, 1-hydroxy-2-(1'-sulfonaphth-2'-ylazo)-7-(4''-amino-2'',5''-disulfophenylazo)-8-aminonaphthalene-3,6-disulfonic acid, 1-hydroxy-2-(1'-sulfonaphth-2'-ylazo)-7-(4''-amino-2'',5''-disulfophenylazo)-8-aminonaphthalene-3,5-disulfonic acid, 1-hydroxy-2-(1'-sulfo-5'-aminomethylnaphth-2'-ylazo)-7-(2''-sulfophenylazo)-8-aminonaphthalene-3,6-disulfonic acid, 1-hydroxy-2-(2'-sulfophenylazo)-7-(1''-sulfo-5''-aminomethylnaphth-2''-ylazo)-8-aminonaphthalene-3,6-disulfonic acid, 1-hydroxy-2-(1'-sulfo-5'-aminomethylnaphth-2'-ylazo)-7-(1''-sulfonaphth-2''-ylazo)-8-aminonaphthalene-3,6-disulfonic acid, 1-hydroxy-2-(1'-sulfonaphth-2'-ylazo)-7-(1''-sulfo-5''-aminomethylnaphth-2''-ylazo)-8-aminonaphthalene-3,6-disulfonic acid, 1-hydroxy-2-(1',7'-disulfo-5'-aminoethylnaphth-2'-ylazo)-7-(2''-sulfophenylazo)-8-aminonaphthalene-3,6-disulfonic acid, 1-hydroxy-2-(2'-sulfophenylazo)-7-(1'',7''-disulfo-5''-aminomethylnaphth-2''-ylazo)-8-aminonaphthalene-3,6-disulfonic acid, 1-hydroxy-2-(5'-aminomethyl-4'-methyl-2'-sulfophenylazo)-b 7-(1''-sulfonaphth-2''-ylazo)-8-aminonaphthalene-3,6-disulfonic acid, 1-hydroxy-2-(1'-sulfonaphth-2'-ylazo)-7-(5''-aminomethyl-4''-methyl-2''-sulfophenylazo)-8-aminonaphthalene-3,6-disulfonic acid, 1-hydroxy-2-(2'-sulfophenylazo)-7-(5''-amino-2''-sulfophenylazo)-8-aminonaphthalene-3,6-disulfonic acid, 1-hydroxy-2-(5'-amino-2'-sulfophenylazo)-7-(2''-sulfophenylazo)-8-aminonaphthalene-3,6-disulfonic acid, 1-hydroxy-2-(2'-sulfophenylazo)-7-(5''-amino-2'', 4''-disulfophenylazo)-8-aminonaphthalene-3,6-disulfonic acid, 1-hydroxy-2-(1'-sulfonaphth-2'-ylazo)-7-(1'',7''-disulfo-5''-aminomethylnaphth-2''-ylazo)-8-aminonaphthalene-3,6-disulfonic acid, 1-hydroxy-2-(1'-sulfonaphth-2'-ylazo)-7-(5''-amino-4''-methyl-2''-sulfophenylazo)-8-aminonaphthalene-3,6-disulfonic acid, 1-hydroxy-2-(1'-sulfonaphth-2'-ylazo)-7-(4''-amino-5''-methoxy-2''-sulfophenylazo)-8-aminonaphthalene-3,6-disulfonic acid, 1-hydroxy-2-(1'-sulfonaphth-2'-ylazo)-7-(5''-amino-4''-methoxy-2''-sulfophenylazo)-8-aminonaphthalene-3,6-disulfonic acid, 1-hydroxy-2-(2'-sulfophenylazo)-7-(4''-amino-5''-methoxy-2''-sulfophenylazo)-8-aminonaphthalene-3,6-disulfonic acid, 1-hydroxy-2-(4'-amino-5'-methoxy-2'-sulfophenylazo)-7-(1''-sulfonaphth-2''-ylazo)-8-aminonaphthalene-3,6-disulfonic acid, 1-hydroxy-2-(5'-amino-4'-methoxy-2'-sulfophenylazo)-7-(1''-sulfonaphth-2''-ylazo)-8-aminonaphthalene-3,6-disulfonic acid and 1-hydroxy-2-(4'-amino-5'-methoxy-2'-sulfophenylazo)-7-(2''-sulfophenylazo)-8-aminonaphthalene-3,6-disulfonic acid.

Dye compounds represented by the following formula (2)' in the free acid form.

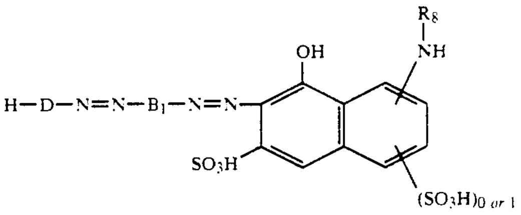

(2)' wherein D, $B_1$ and $R_8$ are as defined above, include, for example, 8-amino-1-hydroxy-2-[4'-(1''-sulfonaphth-2''-ylazo)-2'-methoxy-5'-methylphenylazo]naphthalene-3,6- or 3,5-disulfonic acid, 8-amino-1-hydroxy-2-[4'-(1'',7''-disulfonaphth-2''-ylazo)-2'-methoxy-5'-methylphenylazo]naphthalene-3,6- or 3,5-disulfonic acid, 8-amino-1-hydroxy-2-[4'-(6''-sulfonaphth-2''-ylazo)-2'-methoxy-5'-methylphenylazo]naphthalene-3,6- or 3,5-disulfonic acid, 8-amino-1-hydroxy-2-[4'-(8''-sulfonaphth-2''-ylazo)-2'-methoxy-5'-methylphenylazo]naphthalene-3,6- or 3,5-disulfonic acid, 8-amino-1-hydroxy-2-[4'-(2''-sulfophenylazo)-2'-methoxy-5'-methylphenylazo]naphthalene-3,6- or 3,5-disulfonic acid, 8-amino-1-hydroxy-2-[4'-(1''-sulfonaphth-2''-ylazo)-2',5'-dimethoxyphenylazo]naphthalene-3,6- or 3,5-disulfonic acid, 8-amino-1-hydroxy-2-[4'-(1'',7''-disulfonaphth-2''-ylazo)-2',5'-dimethylphenylazo]naphthalene-3,6- or 3,5-disulfonic acid, 8-amino-1-hydroxy-2-[4'-(6''-sulfonaphth-2''-ylazo)-2',5'-dimethylphenylazo]naphthalene-3,6- or 3,5-disulfonic acid, 8-amino-1-hydroxy-2-[4'-phenylazo-2'-methoxy-5'-methylphenylazo]naphthalene-3,6-disulfonic acid, 8-amino-1-hydroxy-2-[4'-(2''-methoxyphenylazo)-2'-methoxy-5'-methylphenylazo]naphthalene-3,6- or 3,5-disulfonic acid, 8-amino-1-hydroxy-2-[4'-(4''-methoxyphenylazo)-2'-methoxy-5'-methylphenylazo]naphthalene-3,6-disulfonic acid, 8-amino-1-hydroxy-2-[4'-(1''-sulfonaphth-2''-ylazo)-2'-methoxy-5'-acetylaminophenylazo]naphthalene-3,6-disulfonic acid, 8-amino-1-hydroxy-2-[4'-(6''-sulfonaphth-2''-ylazo)-2'-methoxy-5'-acetylaminophenylazo]naphthalene-3,6- or 3,5-disulfonic acid, 8-amino-1-hydroxy-2-[4'-(1",7"-disulfonaphth-2"-ylazo)-2'-methoxy-5'-acetylaminophenylazo]-naphthalene-3,6-disulfonic acid, 8-amino-1-hydroxy-2-[4'-(6"-sulfonaphth-2"-ylazo)-2',5'-dimethylphenylazo]naphthalene-3,6- or 3,5-disulfonic acid, 8-amino-1-hydroxy-2-[4'-(6"-sulfonaphth-2"-ylazo)-5'-ureidophenylazo]naphthalene-3,6-disulfonic acid, 8-amino-1-hydroxy-2-[4'-(6"-sulfonaphth-1"-ylazo)-7'-sulfonaphth-1'-ylazo]naphthalene-3,6- or 3,5-disulfonic acid, 8-amino-1-hydroxy-2-[4'-(1"-sulfonaphth-2"-ylazo)-6'-sulfonaphth-1'-ylazo]naphthalene-3,6-disulfonic acid, 8-amino-1-hydroxy-2-[4'-(1"-sulfonaphth-2"-ylazo)-7'-sulfonaphth-1'-ylazo]naphthalene-3,6- or 3,5-disulfonic acid, 8-amino-1-hydroxy-2-[4'-(1"-sulfonaphth-2"-ylazo)-5'-methylphenylazo]naphthalene-3,6-disulfonic acid, 8-amino-1-hydroxy-2-[4'-(6"-sulfonaphth-2"-ylazo)-5'-methylphenylazo]naphthalene-3,6-disulfonic acid, 8-amino-1-hydroxy-2-[4'-(6"-sulfonaphth-2"-ylazo)-2'-sulfonaphth-1'-ylazo]naphthalene-3,6-disulfonic acid, 8-amino-1-hydroxy-2-[4'-(6"-sulfonaphth-2"-ylazo)-2'-ethoxy-5'-methylphenylazo]naphthalene-3,6- or 3,5-disulfonic acid, 6-amino-1-hydroxy-2-[4'-(1"-sulfo-2"-naphthylazo)-2'-sulfophenylazo]naphthalene-3-sulfonic or 3,5-disulfonic acid, 6-amino-1-hydroxy-2-[4'-(2"-naphthylazo)-2'-sulfophenylazo]naphthalene-3-sulfonic or 3,5-disulfonic acid, 6-amino-1-hydroxy-2-[4'-(1",7"-disulfo-2"-naphthylazo)-2'-sulfophenylazo]naphthalene-3-sulfonic or 3,5-disulfonic acid, 6-amino-1-hydroxy-2-[4'-(6"-sulfo-2"-naphthylazo)-2'-sulfophenylazo]naphthalene-3-sulfonic or 3,5-disulfonic acid, 6-amino-1-hydroxy-2-[4'-(8"-sulfo-2"-naphthylazo)-2'-sulfophenylazo]naphthalene-3-sulfonic or 3,5-disulfonic acid, 6-amino-1-hydroxy-2-[4'-(1"-sulfo-2"-naphthylazo)-2'-sulfo-5'-ureidophenylazo]naphthalene-3-sulfonic or 3,5-disulfonic acid, 6-amino-1-hydroxy-2-[4'-(6"-sulfo-2"-naphthylazo)-2'-sulfo-5'-ureidophenylazo]naphthalene-3-sulfonic or 3,5-disulfonic acid, 6-amino-1-hydroxy-2-(4'-phenylazo-2'-sulfophenylazo]-naphthalene-3-sulfonic or 3,5-disulfonic acid, 6-amino-1-hydroxy-2-[4'-(1"-sulfo-2"-naphthylazo)-2'-sulfo-5'-methylphenylazo]naphthalene-3-sulfonic or 3,5-disulfonic acid, 6-amino-1-hydroxy-2-[4'-(6"-sulfo-2"-naphthylazo)-2'-sulfo-5'-methylphenylazo]naphthalene-3-sulfonic or 3,5-disulfonic acid, 6-amino-1-hydroxy-2-[4'-(1"-sulfo-2"-naphthylazo)-2'-methoxy-5'-methylphenylazo]naphthalene-3-sulfonic or 3,5-disulfonic acid, 6-amino-1-hydroxy-2-[4'-(6"-sulfo-2"-naphthylazo)-2'-methoxy-5'-methylphenylazo]naphthalene-3-sulfonic or 3,5-disulfonic acid, 6-amino-1-hydroxy-2-[4'-(1"-sulfo-2"-naphthylazo)-2'-sulfo-5'-acetylaminophenylazo]-naphthalene-3-sulfonic or 3,5-disulfonic acid, 6-amino-1-hydroxy-2-(4'-phenylazo-2'-sulfo-5'-acetylaminophenylazo]naphthalene-3-sulfonic or 3,5-disulfonic acid, 6-amino-1-hydroxy-2-[4'-(7"-sulfo-2"-naphthylazo)-2'-sulfophenylazo]naphthalene-3-sulfonic or 3,5-disulfonic acid, 6-amino-1-hydroxy-2-[4'-(1"-sulfo-2"-naphthylazo)-2'-sulfo-5'-methoxyphenylazo]naphthalene-3-sulfonic or 3,5-disulfonic acid, 6-amino-1-hydroxy-2-[4'-(1"-sulfo-2"-naphthylazo)-2'-sulfo-5'-chlorophenylazo]naphthalene-3-sulfonic or 3,5-disulfonic acid, 6-amino-1-hydroxy-2-(4'-phenylazo-2'-sulfo-5'-methylphenylazo)naphthalene-3-sulfonic or 3,5-disulfonic acid, 6-amino-1-hydroxy-2-(4'-phenylazo-2'-sulfo-5'-ureidophenylazo)naphthalene-3-sulfonic or 3,5-disulfonic acid, 6-amino-1-hydroxy-2-[4'-(1"-sulfo-2"-naphthylazo)-2'-carboxyphenylazo]naphthalene-3-sulfonic or 3,5-disulfonic acid, 6-amino-1-hydroxy-2-[4'-(6"-sulfo-2"-naphthylazo)-2'-sulfo-5'-acetylaminophenylazo]-naphthalene-3-sulfonic or 3,5-disulfonic acid, 6-amino-1-hydroxy-2-[4'-(2"-naphthylazo)-2'-sulfo-5'-ureidophenylazo]naphthalene-3-sulfonic or 3,5-disulfonic acid. 6-amino-1-hydroxy-2-[4'-(2"-naphthylazo)-2'-sulfo-5'-methylphenylazo]naphthalene-3-sulfonic or 3,5-disulfonic acid, 6-amino-1-hydroxy-2-[4'-(2"-methoxyphenylazo)-2'-sulfophenylazo]naphthalene-3-sulfonic or 3,5-disulfonic acid, 6-amino-1-hydroxy-2-[4'-(2"-sulfophenylazo)-2'-sulfophenylazo]naphthalene-3-sulfonic or 3,5-disulfonic acid and 6-amino-1-hydroxy-2-[4'-(4"-methoxyphenylazo)-2'-sulfophenylazo]naphthalene-3-sulfonic or 3,5-disulfonic acid.

Dye compounds represented by the following formula (3)' in the free acid form, $$H-D-N=N-B_1-N=N-E-\underset{\substack{|\\ R_{11}}}{NH} \qquad (3)'$$

wherein D, $B_1$, E and $R_{11}$ are as defined above, include, for example,

4-[4'-(1"-sulfonaphth-2"-ylazo)-7'-sulfonaphth-1'-ylazo]-1-naphthylamine-8-sulfonic acid, 4-[4'-(6"-sulfonaphth-2"-ylazo)-7'-sulfonaphth-1'-ylazo]-1-naphthylamine-8-sulfonic acid, 4-[4'-(1",7"-disulfonaphth-2"-ylazo)-7'-sulfonaphth-1'-ylazo]-1-naphthylamine-8-sulfonic acid, 4-[4'-(8"-sulfonaphth-2"-ylazo)-7'-sulfonaphth-1'-ylazo]-1-naphthylamine-8-sulfonic acid, 4-[4'-(2"-sulfophenylazo)-7'-sulfonaphth-1'-ylazo]-1-naphthylamine-8-sulfonic acid, 4-[4'-(1"-sulfonaphth-2"-ylazo)-7'-sulfonaphth-1'-ylazo]-3-methyl-1-aminobenzene, 4-[4'-(6"-sulfonaphth-2"-ylazo)-7'-sulfonaphth-1'-ylazo]-3-methyl-1-aminobenzene, 4-[4'-(1",7"-disulfonaphth-2"-ylazo)-7'-sulfonaphth-1'-ylazo]-3-methyl-1-aminobenzene, 4-[4'-(8"-sulfonaphth-2"-ylazo)-7'-sulfonaphth-1'-ylazo]-3-methyl-1-aminobenzene, 4-[4'-(2"-sulfophenylazo)-7'-sulfonaphth-1'-ylazo]-3-methyl-1-aminobenzene, 4-[4'-(1"-sulfonaphth-2"-ylazo)-6'-sulfonaphth-1'-ylazo]-1-naphthylamine-8-sulfonic acid, 4-[4'-(6"-sulfonaphth-2"-ylazo)-6'-sulfonaphth-1'-ylazo]-3-methyl-1-aminobenzene, 4-[4'-(1",7"-disulfonaphth-2"-ylazo)-6'-sulfonaphth-1'-ylazo]-1-naphthylamine-8-sulfonic acid,
4-[4'-(6"-sulfonaphth-2"-ylazo)-6'-sulfonaphth-1'-ylazo]-1-naphthylamine-8-sulfonic acid,
4-[4'-(2"-sulfophenylazo)-6'-sulfonaphth-1'-ylazo]-3-methyl-1-aminobenzene,
4-[4'-(1"-sulfonaphth-2"-ylazo)-6'-sulfonaphth-1'-ylazo]-3-methyl-1-aminobenzene,
4-[4'-(8"-sulfonaphth-2"-ylazo)-6'-sulfonaphth-1'-ylazo]-1-naphthylamine-8-sulfonic acid,
4-[4'-(1",7"-disulfonaphth-2"-ylazo)-6'-sulfonaphth-1'-ylazo]-3-methyl-1-aminobenzene,
4-[4'-(8"-sulfonaphth-2"-ylazo)-6'-sulfonaphth-1'-ylazo]-3-methyl-1-aminobenzene,
4-[4'-(2"-sulfophenylazo)-6'-sulfonaphth-1'-ylazo]-1-naphthylamine-8-sulfonic acid,
4-[4'-phenylazo-7'-sulfonaphth-1'-ylazo]-1-naphthylamine-8-sulfonic acid,
4-[4'-phenylazo-7'-sulfonaphth-1'-ylazo]-3-methyl-1-aminobenzene,
4-[4'-(2"-sulfophenylazo)-2',5'-dimethyl-phenylazo]-1-naphthylamine-8-sulfonic acid,
4-[4'-(2",5"-disulfonaphth-1"-ylazo)-2',5'-dimethyl-phenylazo]-1-naphthylamine-6-sulfonic acid,
4-[4'-(2",7"-disulfonaphth-1"-ylazo)-2',5'-dimethyl-phenylazo]-1-naphthylamine-7-sulfonic acid,
4-[4'-(2",7"-disulfonaphth-1"-ylazo)naphth-1'-ylazo]-1-naphthylamine-6-sulfonic acid,
4-[4'-(2"-sulfophenylazo)-2'-sulfophenylazo]-naphthylamine-6-sulfonic acid,
4-[4'-(6"-sulfonaphth-2"-ylazo)-2'-methoxy-5'-acetylaminophenylazo]-1-aminonaphthalene-8-sulfonic
4-[4'-(6"-sulfonaphth-2"-ylazo)-2'-methoxy-5'-acetylaminophenylazo]-3-methyl-1-aminobenzene.
4-[4'-(1",7"-disulfonaphth-2"-ylazo)-2'-methyl-phenylazo]-2-methoxy-5-methyl-1-aminobenzene,
4-[4'-(1",7"-disulfonaphth-2"-ylazo)-phenylazo]-3-methyl-1-aminobenzene,
4-[4'-(1",7"-disulfonaphth-2"-ylazo)-3'-acetylamino-phenylazo]-3-methyl-1-aminobenzene,
4-[4'-(6"-sulfonaphth-2"-ylazo)-7'-sulfonaphth-1'-ylazo]-2,5-dimethyl-1-aminobenzene,
4-[4'-(1",7"-disulfonaphth-2"-ylazo)-7'-sulfonaphth-1'-ylazo]-2,5-dimethyl-1-aminobenzene,
4-[4'-(6"-sulfonaphth-2"-ylazo)-3'-ureidophenylazo]-2-methoxy-5-methyl-1-aminobenzene, and
4-[4'-(1",7"-disulfonaphth-2"-ylazo)-phenylazo]-1-aminobenzene.

Examples of dye compounds represented by the following formula (4)' in the free acid form,

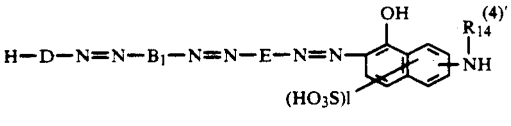

(4)' wherein D, $B_1$, E, $R_{14}$ and l are as defined above, are obvious with reference to Examples described below. The polyazo compound of the formula (I) can be readily produced by reacting the dye compound of the formula (II), the amine compound of the formula (III) and any one of compounds of the formulas (IV) to (VI) with a 2,4,6-trihalogeno-s-traiazine in any order.

The order of reactions with the 2,4,6-trihalogeno-s-triazine and the reaction conditions are not particularly limited. Preferably, a first reaction can be carried out at a temperature of −10° to 40° C. within a pH range of 2 to 9, a second reaction at a temperature of 0° to 70° C. within a pH range of 2 to 9, and a third reaction at a temperature of 10° to 100° C. within a pH range of 2 to 7, thereby obtaining the desired polyazo compound of the formula (I) or a salt thereof.

In the above, the 2,4,6-trihalogeno-s-triazine is preferably cyanuric chloride or fluoride.

After the completion of the reaction, the desired polyazo compound-containing reaction mixture may be formed into a liquid commercial product, if desired, after removing inorganic salts and with the addition of a stabilizer or a dyeing improver. The liquid product obtained or the aforesaid reaction mixture may be subjected to evaporation or spray-drying, thereby obtaining a solid commercial product. Alternatively, according to a conventional manner, the reaction mixture may be formed into either a liquid or solid commercial product through salting-out using an electrolyte.

The polyazo compound (I) in accordance with the present invention may be in the form of a free acid or preferably in the form of an alkali metal or alkaline earth metal salt such as sodium, potassium or lithium salt.

The polyazo compound (I) of the present invention is fiber-reactive and useful for dyeing or printing hydroxyl group-containing and amide group-containing materials in a fibrous form including unmixed or mixed fibers.

The hydroxyl group-containing materials include natural or synthetic hydroxyl group-containing materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in any suitable manner, which can be selected from conventional manners depending on the physical and chemical properties of said fiber materials.

For example, cellulose fiber materials can be dyed using the polyazo compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired, using a neutral salt such as sodium sulfate, sodium chloride and the like, together with a hydrotropic agent, a penetrant or a level dyeing agent. The neutral salt suitable for promoting the exhaustion may be added to a dye bath before or after the temperature reaches a desired level for the dyeing, if desired, dividedly.

The padding can be carried out by padding the fiber materials at ambient temperature or an elevated temperature, and after drying, steaming or dry-heating the materials to perform the dye-fixation.

The printing can be carried out in a one-phase or two-phase manner. The one-phase printing may be conducted by printing the fiber materials with a printing paste containing an acid binding agent such as sodium hydrogencarbonate and the like, followed by steaming at a temperature of 100° to 160° C. The two-phase printing may be conducted by printing the fiber materials with a neutral or weakly acidic printing paste, and then passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or a dispersing agent.

The acid binding agents useful for fixing the compound of the present invention onto the cellulose fiber materials include water-soluble basic salts consisting of alkali or alkaline earth metals and inorganic or organic acids or compounds capable of liberating alkali under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogencarbonate, sodium carbonate, sodium formate, potassium carbonate, sodium dihydrogenphosphate, disodium hydrogenphosphate, trisodium phosphate, sodium silicate, sodium trichloroacetate and the like.

The dyeing of natural or synthetic polyamide and polyurethane fiber materials can be carried out by performing exhaustion in an acid or weak acid bath, while controlling the pH value, and then making the bath neutral, or in some cases alkaline, to perform the fixation. The dyeing temperature usually ranges usually from 60° to 120° C. In order to achieve level dyeing, there may be used a conventional level dyeing agent such as a condensation product of cyanuric chloride and 3 times by mole of aminobenzenesulfonic acid or aminonaphthalene-sulfonic acid, or an addition product of stearylamine and ethylene oxide, and the like.

The polyazo compound of the present invention can be characterized by excellent dye performance in the dyeing and printing of fiber materials, particularly cellulose fiber materials. For example, the compound can give a dyed product excellent in light fastness, perspiration-light fastness, wet fastness such as washing resistance, peroxide-washing resistance, chlorine resistance, perspiration resistance and acid-hydrolysis resistance, and alkali fastness, abrasion fastness and iron fastness. The polyazo compound can also exhibit extremely excellent build-up, level-dyeing and washing-off properties and high solubility as well as high exhaustion and fixation percentages. Moreover, when used for the dyeing or printing, the polyazo compound is hardly affected by changes in the dye bath conditions such as dyeing temperature and bath ratios, and therefore the dyed or printed products can be obtained with a constant quality.

Furthermore, it is hard to color of the dyed or printed products in accordance with the present invention on a fix-treatment or resin-finishing, or in contact with a basic material during storage.

The present invention is illustrated in more detail with reference to the following Examples, which are only illustrative, and not limiting. In examples, parts and % are by weight, unless otherwise specified.

EXAMPLE 1

In a conventional manner, 2,4-diaminobenzenesulfonic acid (4.70 parts) and cyanuric chloride (4.61 parts) were allowed to react with each other, followed by successive condensation reaction with 1-aminobenzene-3-β-sulfatoethylsulfone (6.95 parts). The resulting condensate was diazotized and then coupled with 1-amino-8-hydroxynaphthalene-3,6-disulfonic acid (7.33 parts) under strong acid conditions. The monoazo compound obtained was further coupled with a diazonium compound of 2-naphthylamine-6-β-sulfatoethylsulfone-1-sulfonic acid (10.25 parts). Finally, the intermediate bisazo compound obtained was subjected to a condensation reaction with aniline (2.33 parts) at a temperature of 70° to 80° C. The reaction mixture was conventionally after-treated including salting-out with sodium chloride to obtain a bisazo compound represented by the following formula in the free acid form.

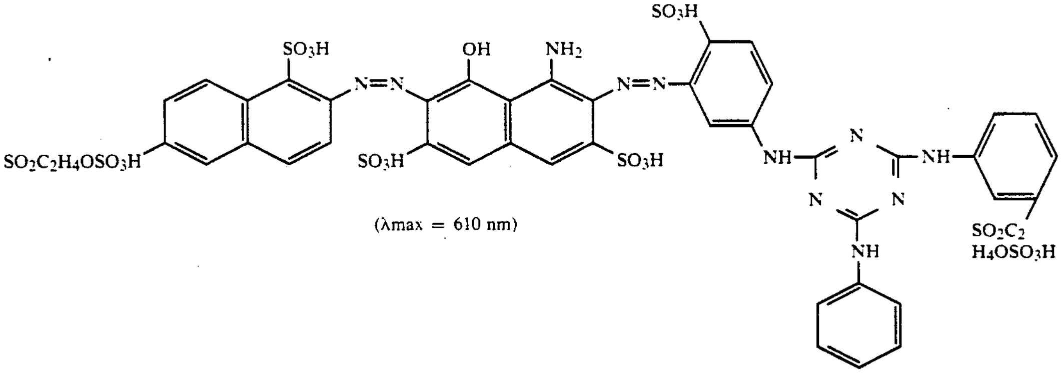

(λmax = 610 nm)

EXAMPLE 2

Example 1 was repeated, except that the 2-naphthylamine 6-β-sulfatoethylsulfone-1-sulfonic acid, 2,4-diaminobenzenesulfonic acid, 1-amino-8-hydroxynaphthalene-3,6-disulfonic acid, aniline and 1-aminobenzene-3-β-sulfatoethylsulfone were replaced by the compounds shown in columns 2 to 6 of the following table, respectively, thereby obtaining a corresponding bisazo compound. The bisazo compound was used to dye cellulose fibers to obtain a dyed product of a color as shown in a column 7 of the following table.

TABLE
| 1 | 2 | 3 | 4 | 5 | 6 | 7 |
|---|---|---|---|---|---|---|
| 1 | 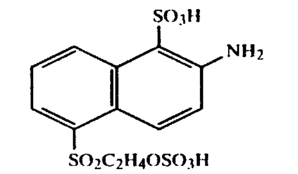 | 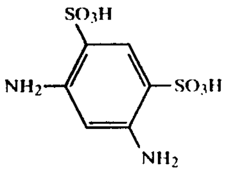 | 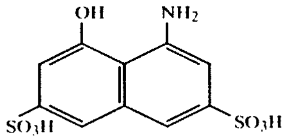 | 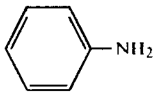 | 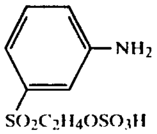 | Navy blue |
| 2 | 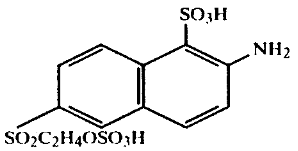 | 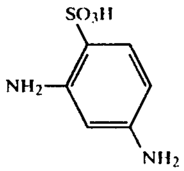 | 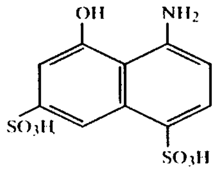 | 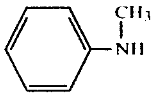 | 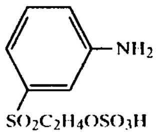 | " |
| 3 | 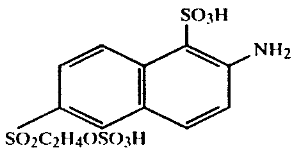 | 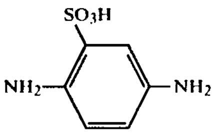 | 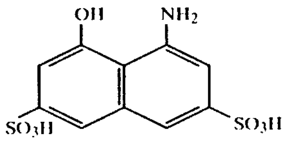 | 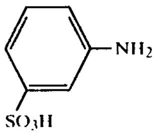 | 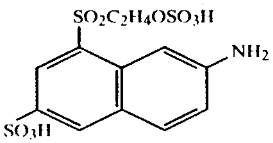 | " |
| 4 | 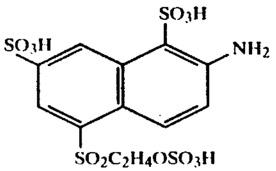 | 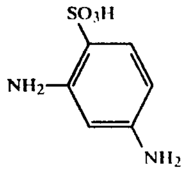 | 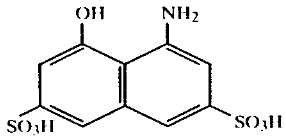 | 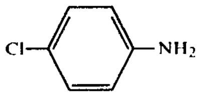 | 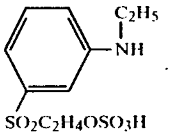 | " |
| 5 |  | 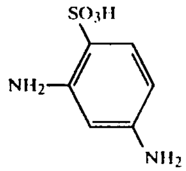 | 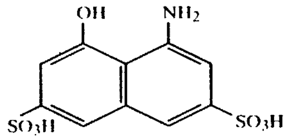 | 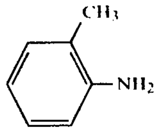 | 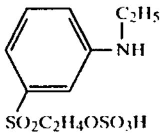 | Navy blue |

TABLE-continued
| 1 | 2 | 3 | 4 | 5 | 6 | 7 |
|---|---|---|---|---|---|---|
| 6 | 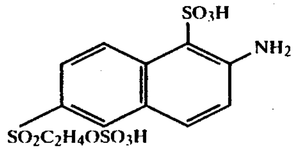  | 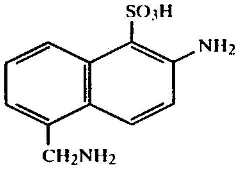  | 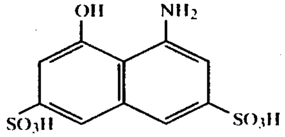  | 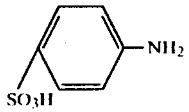  | 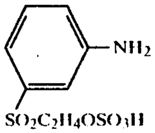  | " |
| 7 | 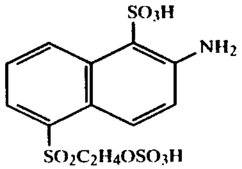  | 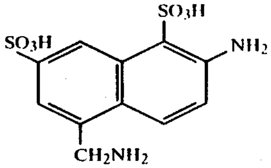  | 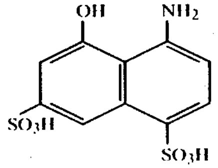  | 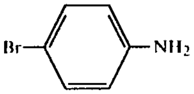  | 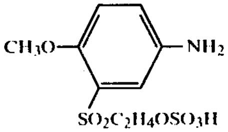  | " |
| 8 | 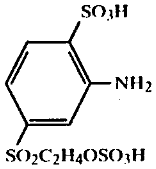  | 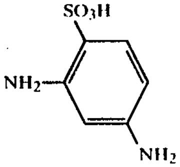  | 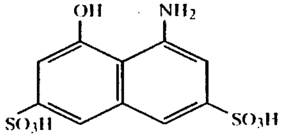  | 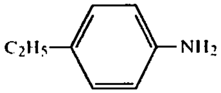  | 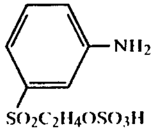  | " |
| 9 | 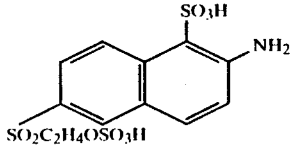  | 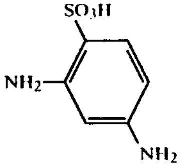  | 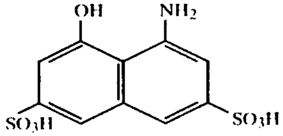  | 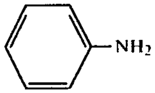  |   | Navy blue |
| 10 | " | 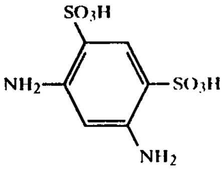  | " | " | 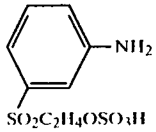  | " |

TABLE-continued
| 1 | 2 | 3 | 4 | 5 | 6 | 7 |
|---|---|---|---|---|---|---|
| 11 | " | 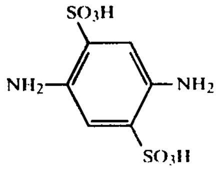 | " | 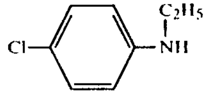 | 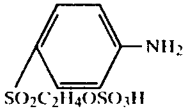 | " |
| 12 | " | 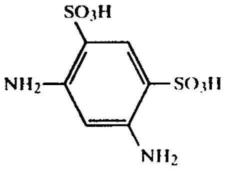 | 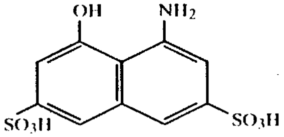 | 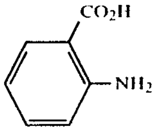 | 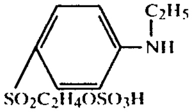 | " |
| 13 | 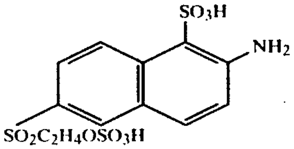 | 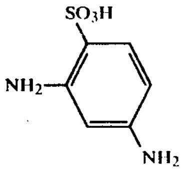 | 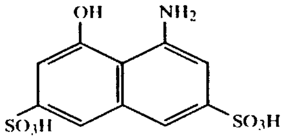 | 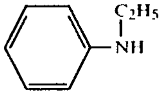 | 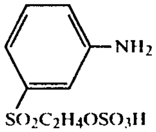 | Navy blue |
| 14 | " | " | " | 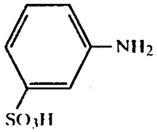 | " | " |
| 15 | " | 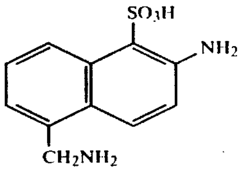 | " | " | 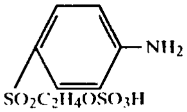 | " |
| 16 | " | 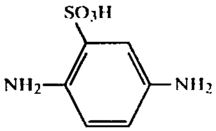 | " | 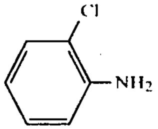 | 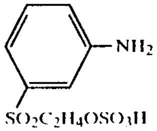 | " |

TABLE-continued
| 1 | 2 | 3 | 4 | 5 | 6 | 7 |
|---|---|---|---|---|---|---|
| 17 | 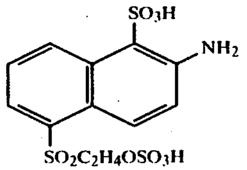 | 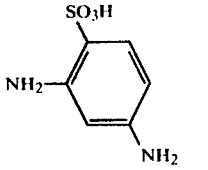 | 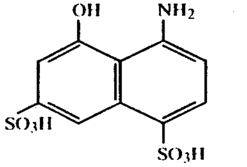 | 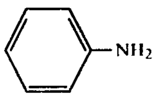 | 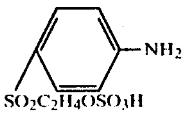 | Navy blue |
| 18 | " | " | 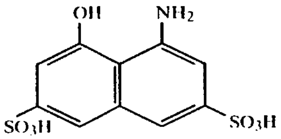 | " | 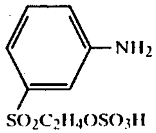 | " |
| 19 |  | " | " | 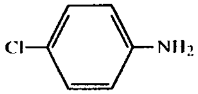 | " | " |
| 20 | " | " | " | 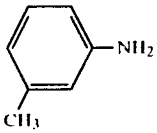 | 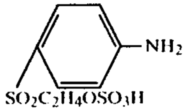 | " |
| 21 | 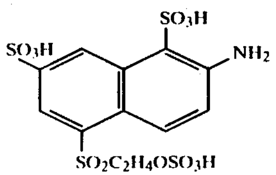 | 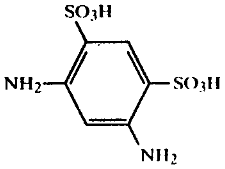 | 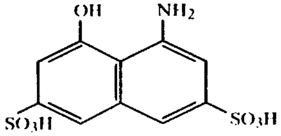 | 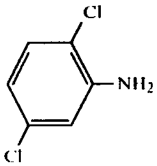 | 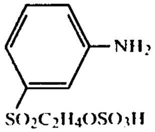 | Navy blue |
| 22 | " | " | " | 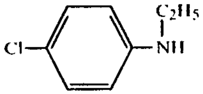 | 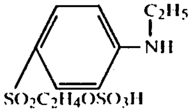 | " |

TABLE-continued
| 1 | 2 | 3 | 4 | 5 | 6 | 7 |
|---|---|---|---|---|---|---|
| 23 | " | " | " | 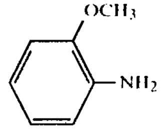 | 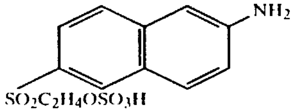 | " |
| 24 | " | 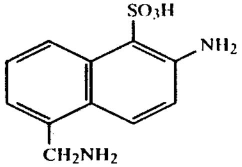 | " | 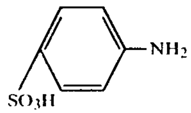 | 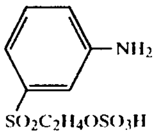 | " |
| 25 | 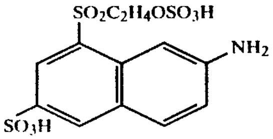 | 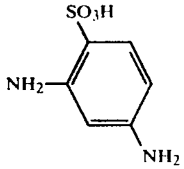 | 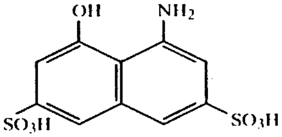 | 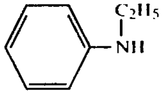 | 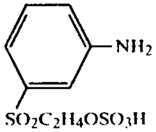 | Navy blue |
| 26 | 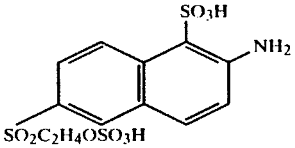 | 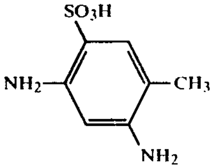 | " | 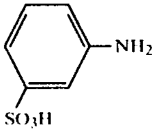 | " | " |
| 27 | 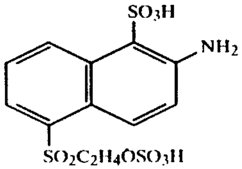 | 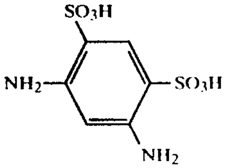 | 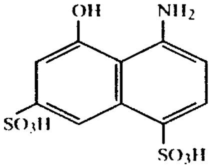 | 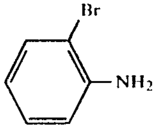 | 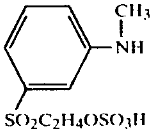 | " |
| 28 | " | 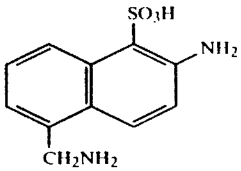 | 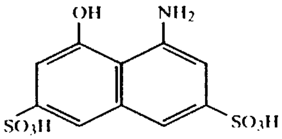 | 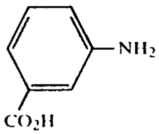 | 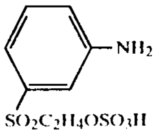 | " |

TABLE-continued
| 1 | 2 | 3 | 4 | 5 | 6 | 7 |
|---|---|---|---|---|---|---|
| 29 | 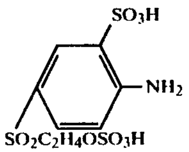 | 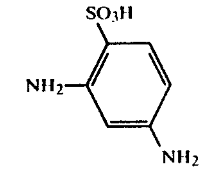 | 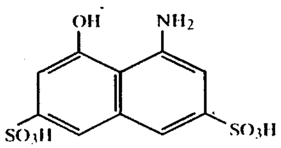 | 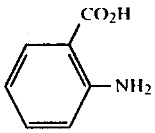 |  | Navy blue |
| 30 | 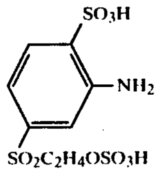 | 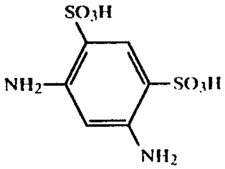 | " | 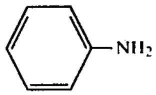 | 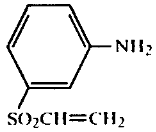 | " |
| 31 | 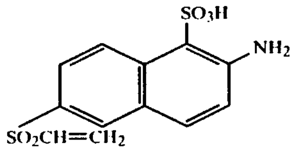 | " | " | " | $ClC_2H_4SO_2C_2H_4NH_2$ | " |
| 32 | " | " | " | 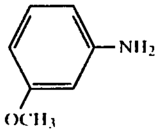 | $NH_2C_2H_4OC_2H_4SO_2CH{=}CH_2$ | " |
| 33 | 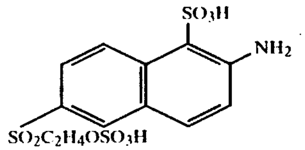 | 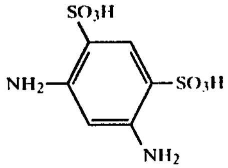 | 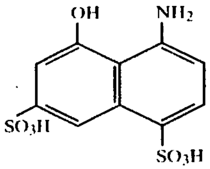 | 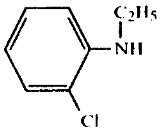 | 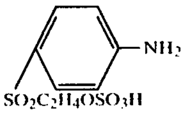 | Navy blue |

TABLE-continued
| 1 | 2 | 3 | 4 | 5 | 6 | 7 |
|---|---|---|---|---|---|---|
| 34 | " | 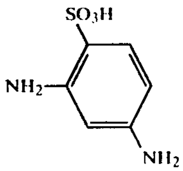 | " | 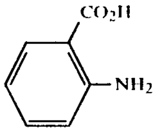 | 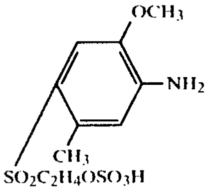 | " |
| 35 |  | " | 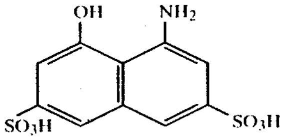 | 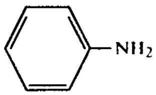 | 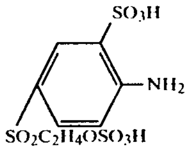 | " |
| 36 | 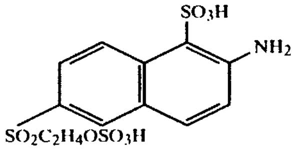 | " | " | 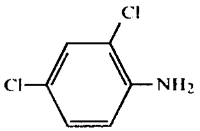 | 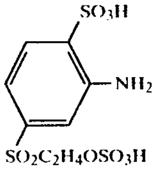 | " |
| 37 | 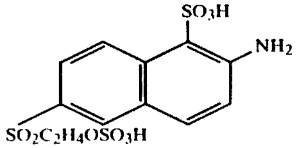 | 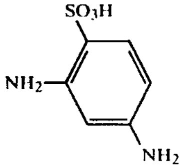 | 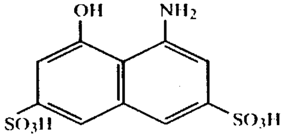 | 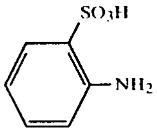 |  | Navy blue |
| 38 | " | " | " | 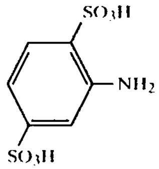 | " | " |

TABLE-continued
| 1 | 2 | 3 | 4 | 5 | 6 | 7 |
|---|---|---|---|---|---|---|
| 39 | " | " | " | 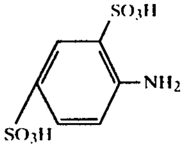 | 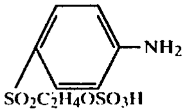 | " |
| 40 | " | " | 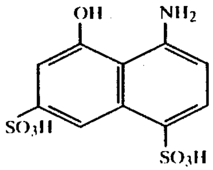 | 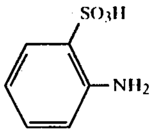 | " | " |
| 41 | 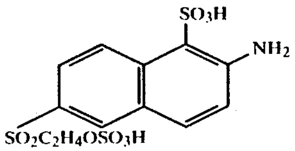 | 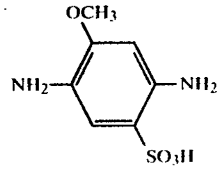 | 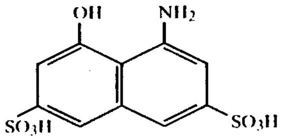 | 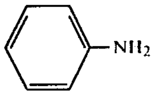 | 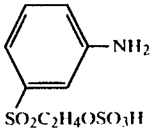 | Navy blue |
| 42 | " | " | " | 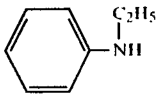 | " | " |
| 43 | " | " | " | 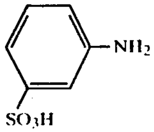 | " | " |
| 44 | " | " | " | 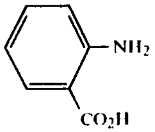 | " | " |

EXAMPLE 3

Example 1 was repeated, except that the coupling order of the respective diazonium compounds was reversed, thereby obtaining a bisazo compound represented by the following formula in the free acid form.

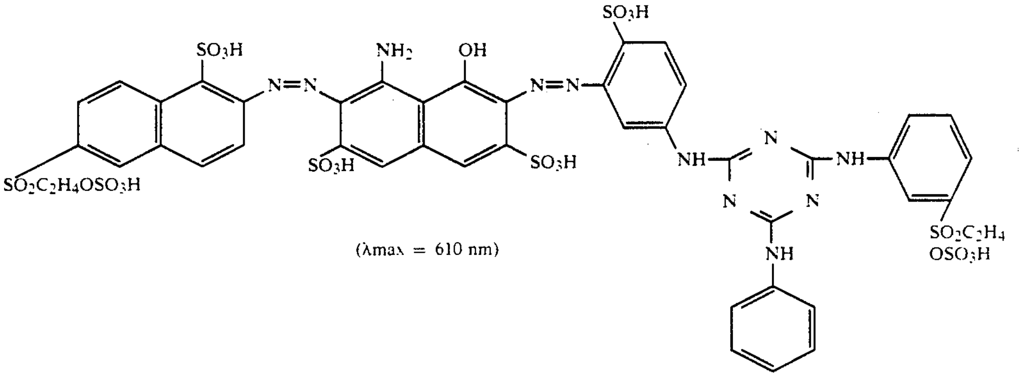

($\lambda max = 610$ nm)

EXAMPLE 4

Example 3 was repeated, except that the 2-naphthylamine 6-β-sulfatoethylsulfone-1-sulfonic acid, 2,4-diaminobenzenesulfonic acid, 1-amino-8-hydroxynaphthalene-3,6-disulfonic acid, aniline and 1-aminobenzene-3-β-sulfatoethylsulfone were replaced by the compounds shown in columns 2 to 6 of the following table, respectively, thereby obtaining a corresponding bisazo compound. The bisazo compound was used to dye cellulose fibers to obtain a dyed product of a color as shown in a column 7 of the following table.

TABLE
| 1 | 2 | 3 | 4 | 5 | 6 | 7 |
|---|---|---|---|---|---|---|
| 1 | 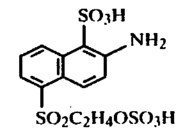 | 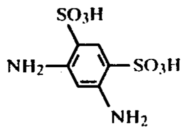 | 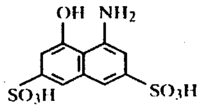 | 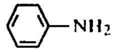 | 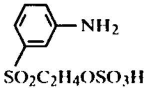 | Navy blue |
| 2 | " | 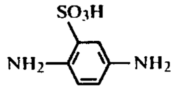 | 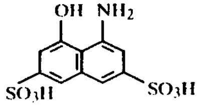 | 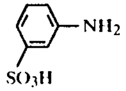 | " | " |
| 3 | 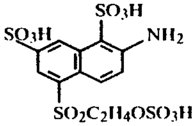 |  | " | 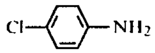 | " | " |
| 4 | 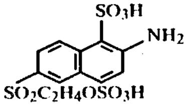 | 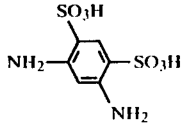 | 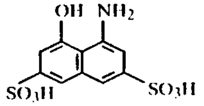 | 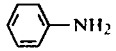 | " | " |
| 5 | 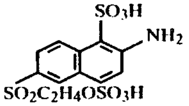 | 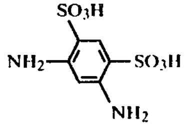 | 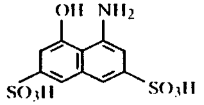 | 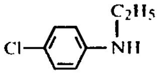 | 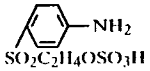 | Navy blue |
| 6 | " | 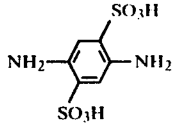 | " | 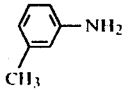 | 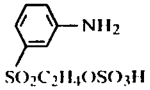 | " |
| 7 | " | 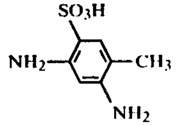 | " | 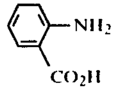 | " | " |

TABLE-continued
| 1 | 2 | 3 | 4 | 5 | 6 | 7 |
|---|---|---|---|---|---|---|
| 8 | 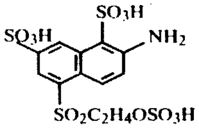 | 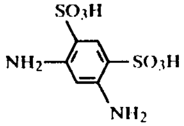 | " | 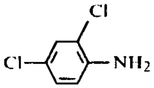 | " | " |
| 9 | 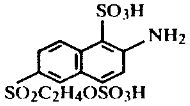 | 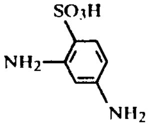 | 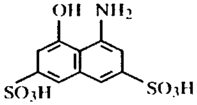 | 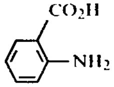 | 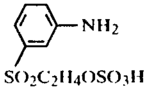 | Navy blue |
| 10 | " | " | " | 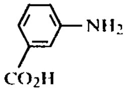 | " | " |
| 11 | " | 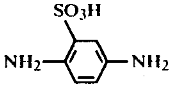 | " | 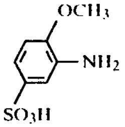 | 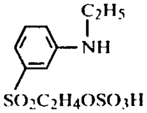 | " |
| 12 | " | 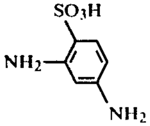 | " | 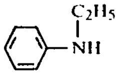 | 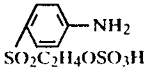 | " |
| 13 | 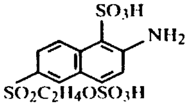 | 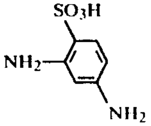 | 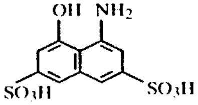 | 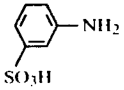 | 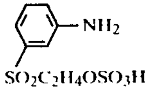 | Navy blue |
| 14 | " | " | " | 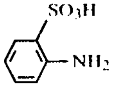 | " | " |
| 15 | 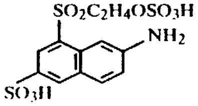 | " | " | 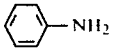 | 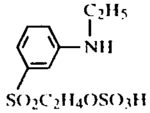 | " |

TABLE-continued
| 1 | 2 | 3 | 4 | 5 | 6 | 7 |
|---|---|---|---|---|---|---|
| 16 | " | " | " | 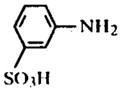 | 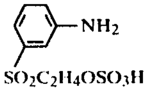 | " |
| 17 | 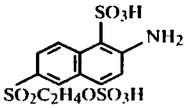 | 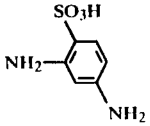 | 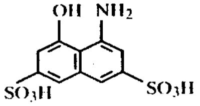 | 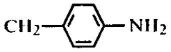 | 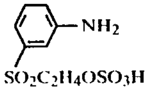 | Navy blue |
| 18 | " | " | " | $NH_2C_2H_4Cl$ | " | " |
| 19 | 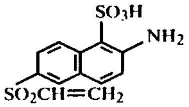 | 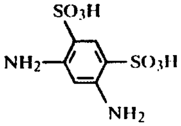 | " | $NH_2C_3H_7$ | $NH_2C_2H_4OC_2H_4SO_2$<br>$CH{=}CH_2$ | " |
| 20 | 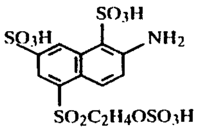 | 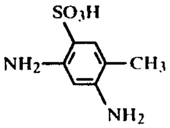 | " | 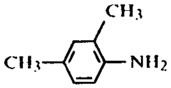 | 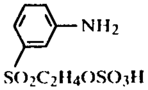 | " |
| 21 | 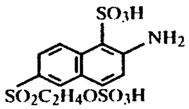 | 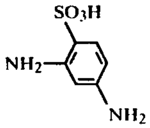 | 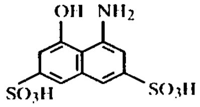 | 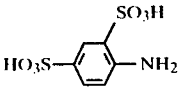 | 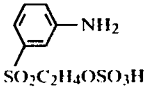 | Navy blue |
| 22 | " | " | " | 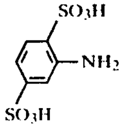 | " | " |
| 23 | " | " | " | 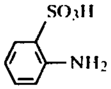 | 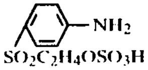 | " |

TABLE-continued
| 1 | 2 | 3 | 4 | 5 | 6 | 7 |
|---|---|---|---|---|---|---|
| 24 | " | 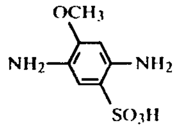 | " | 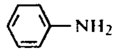 | 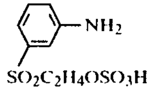 | " |
| 25 | 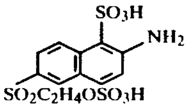 | 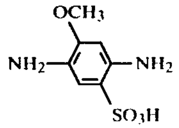 | 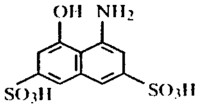 | 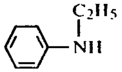 | 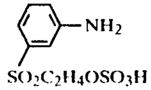 | Navy blue |
| 26 | " | " | " | 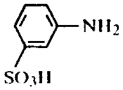 | " | " |
| 27 | " | " | " | 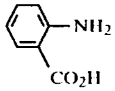 | " | " |
| 28 | 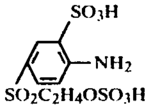 | 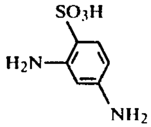 | " | 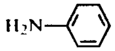 | " | " |
| 29 | " | " | " | 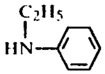 | " | " |
| 30 | " | " | " | 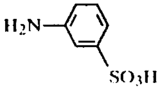 | 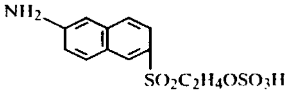 | " |

EXAMPLE 5

Run Nos. 1 to 36 of Example 2 were repeated, except that the compound shown in the column 5 was replaced by each of the compounds shown below, hereby obtaining a corresponding bisazo compound.

phenol
phenol-2,3- or 4-sulfonic acid
phenol-2,4- or 2,5-disulfonic acid
benzylamine
benzylamine-2-, 3- or 4-sulfonic acid
taurine
N-methyltaurine
β-alanine
mono- or di-ethanolamine In the manner described in Example 4, the above was repeated to obtain a corresponding bisazo compound.

EXAMPLE 6

Each bisazo compound described in Example 1 to 5 (each 0.1, 0.3 and 0.6 part) was dissolved in water (200 parts), and sodium sulfate (10 parts) and cotton (10 parts) were added thereto. The bath was heated to 60° C., and then sodium carbonate (4 parts) was added thereto. Dyeing was continued for 1 hours at that temperature. Thereafter, the cotton was removed and washed with water, soaped, washed with water and then dried to obtain each dyed product of a navy blue color superior in fastness properties with a superior build-up property.

EXAMPLE 7

Using each bisazo compound described in Examples 1 to 5, color pastes having the following composition were prepared.

| | |
|---|---|
| Bisazo compound | 5 Parts |
| Urea | 5 Parts |
| Sodium alginate (5%) stock paste | 50 Parts |

-continued

| | |
|---|---|
| Hot water | 25 Parts |
| Sodium hydrogencarbonate | 2 Parts |
| Water (balance) | 13 Parts |

Mercerized cotton broad cloth was printed with the color paste of the above composition, pre-dried, steamed at 100° C. for 5 minutes, washed with hot water, soaped, again washed with hot water, and then dried to obtain a product printed in a navy blue color superior in various fastness properties.

EXAMPLE 8

In a conventional manner, 2-naphthylamine-6-β-sulfatoethylsulfone-1-sulfonic acid (20.5 parts) was diazotized and then coupled with 5-methyl-2-methoxyaniline (6.85 parts) to obtain a monoazo compound.

On the other hand, 1-amino-8-hydroxynaphthalene-3,6-disulfonic acid (16.0 parts) and cyanuric chloride (9.25 parts) were allowed to react with each other, followed by a condensation reaction with N-ethyl aniline (6.0 parts). The condensate obtained was coupled with a diazonium compound of the above monoazo compound in a conventional manner, followed by a condensation reaction with 1-aminobenzene-4-β-sulfatoethylsulfone (14.2 parts). The reaction mixture was conventionally after-treated including salting-out using sodium chloride to obtain a bisazo compound represented by the following formula in the free acid form.

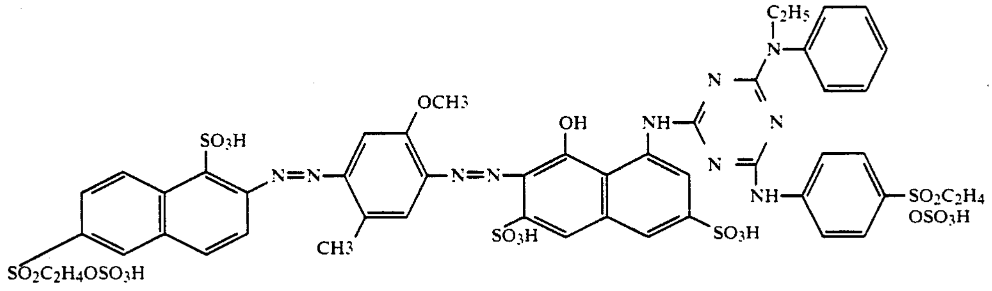

(λmax 590 nm)

EXAMPLE 9

Example 8 was repeated, except that the 2-aminonaphthalene-6-β-sulfatoethylsulfone-1-sulfonic acid, 5-methyl-2-methoxyaniline, 1-amino-8-hydroxynaphthalene-3,6-disulfonic acid, N-ethyl aniline and 1-aminobenzene-4-β-sulfatoethylsulfone were replaced by the compounds shown in columns 2 to 6 of the following table, respectively, thereby obtaining a corresponding bisazo compound. The bisazo compound obtained was used to dye cellulose fibers to obtain a product dyed in a color shown in a column 7 of the table.

TABLE
| 1 | 2 | 3 | 4 | 5 | 6 | 7 |
|---|---|---|---|---|---|---|
| 1 | 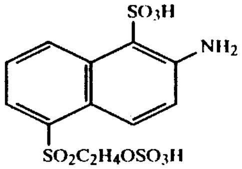 | 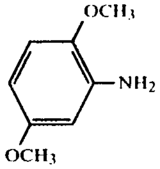 | 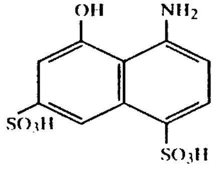 | 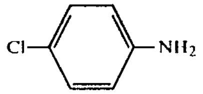 | 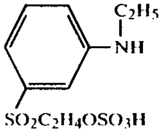 | Blue |
| 2 | 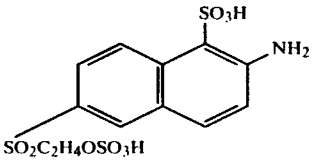 |  | 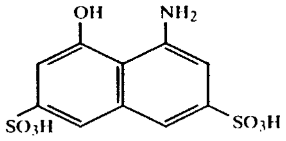 | 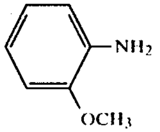 | 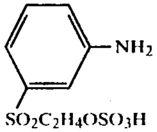 | " |
| 3 | 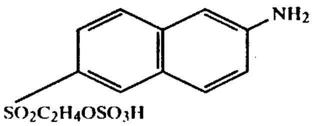 | 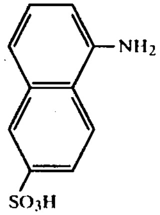 | 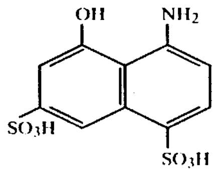 | $H_2NC_2H_2OH$ |  | " |
| 4 | 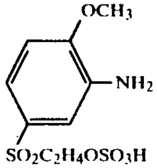 | 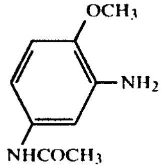 | 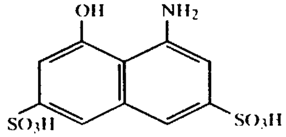 | 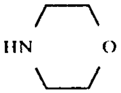 | 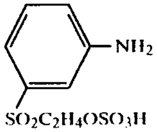 | Reddish blue |
| 5 | 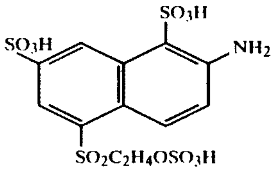 | 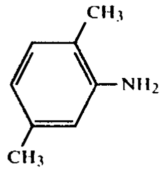 | 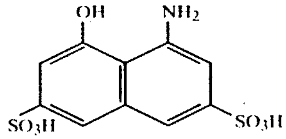 | 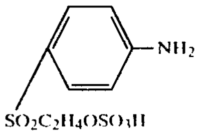 | 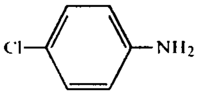 | Blue |

TABLE-continued
| 1 | 2 | 3 | 4 | 5 | 6 | 7 |
|---|---|---|---|---|---|---|
| 6 | 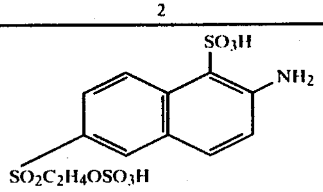 | 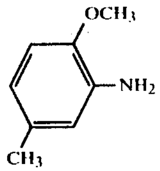 | 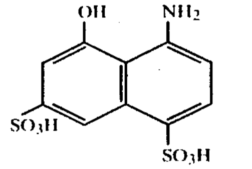 | 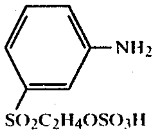 | 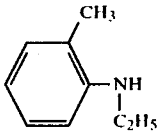 | " |
| 7 | 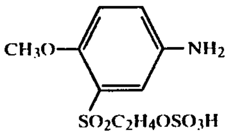 | 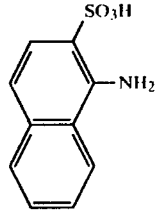 | 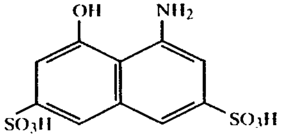 | 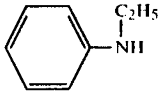 | 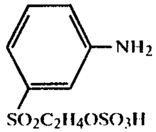 | " |
| 8 | 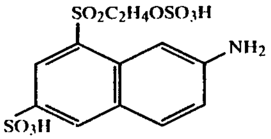 | 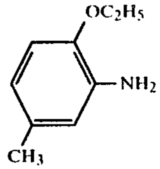 | 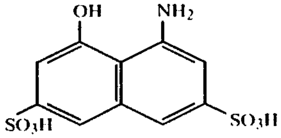 | 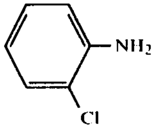 | 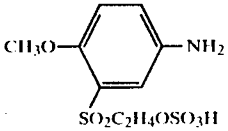 | " |
| 9 | 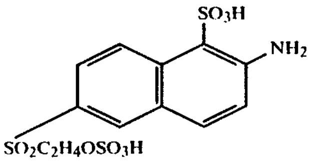 | 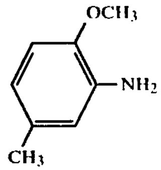 | 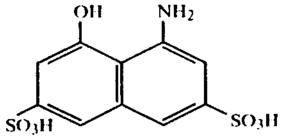 | 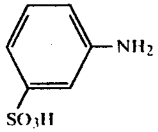 | 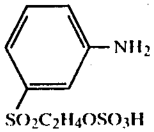 | Blue |
| 10 | " | " | " | 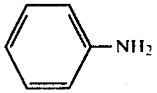 | " | " |
| 11 | " | " | " | 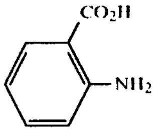 | " | " |

TABLE-continued
| 1 | 2 | 3 | 4 | 5 | 6 | 7 |
|---|---|---|---|---|---|---|
| 12 | " | " | " | 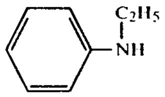 | " | " |
| 13 | 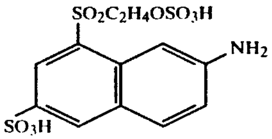 | 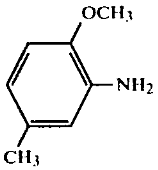 | 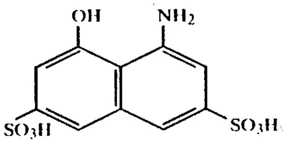 | 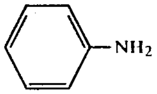 | 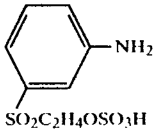 | Blue |
| 14 | " | " | " | 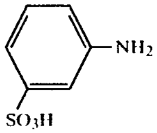 | " | " |
| 15 | " | " | " | 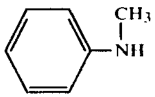 | " | " |
| 16 | " | " | " | 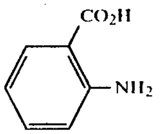 | " | " |
| 17 | 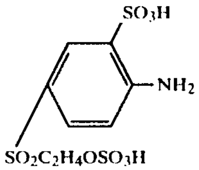 | 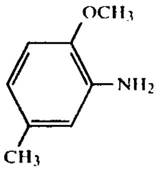 | 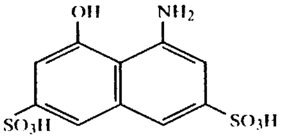 | 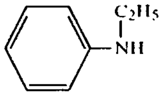 | 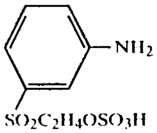 | Blue |

TABLE-continued
| 1 | 2 | 3 | 4 | 5 | 6 | 7 |
|---|---|---|---|---|---|---|
| 18 | 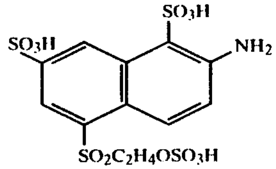 | " | " | $NH_2C_2H_4—SO_3H$ | 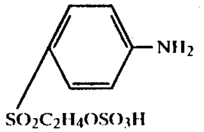 | " |
| 19 | 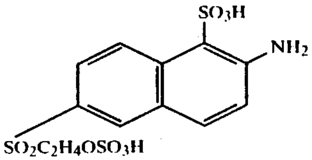 | " | " | " | " | " |
| 20 | " | " | " | $NH_2C_2H_4—CO_2H$ | 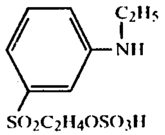 | " |
| 21 | 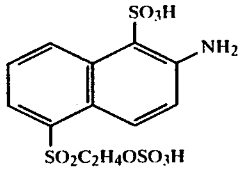 | 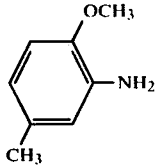 | 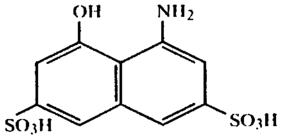 | 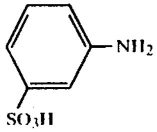 | 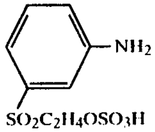 | Reddish blue |
| 22 | 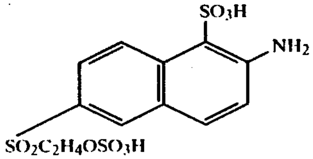 | 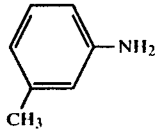 | " | 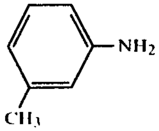 | 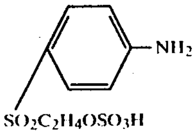 | " |
| 23 | " | " | 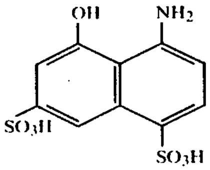 | 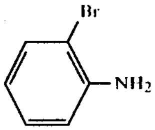 | 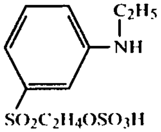 | Blue |

TABLE-continued
| 1 | 2 | 3 | 4 | 5 | 6 | 7 |
|---|---|---|---|---|---|---|
| 24 | 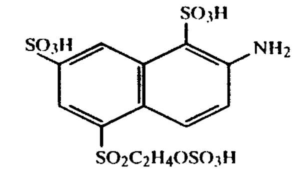 | 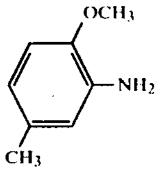 | 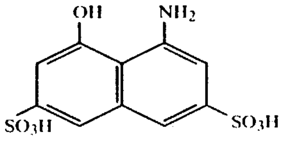 | 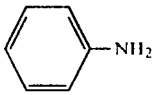 | 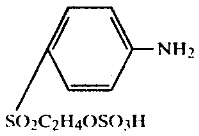 | " |
| 25 | 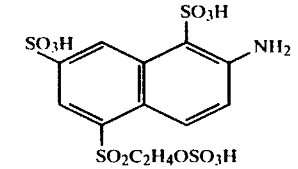 | 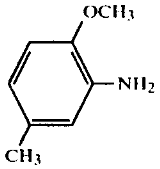 | 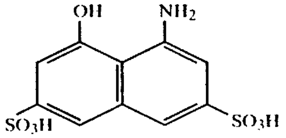 | 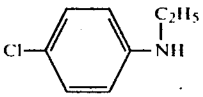 | 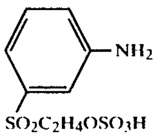 | Blue |
| 26 | 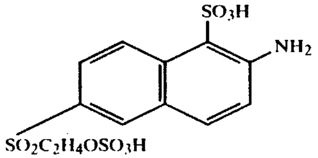 | " | " | $NH_2C_2H_4OC_2H_4SO_2CH{=}CH_2$ | 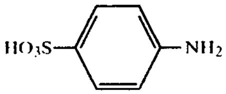 | " |
| 27 | " | 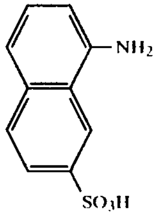 | " | 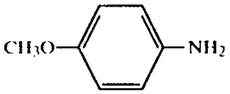 | 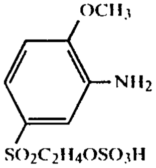 | " |
| 28 | " | 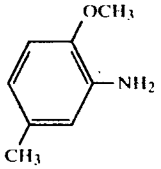 | " | 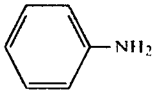 | 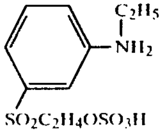 | " |

TABLE-continued
| 1 | 2 | 3 | 4 | 5 | 6 | 7 |
|---|---|---|---|---|---|---|
| 29 | 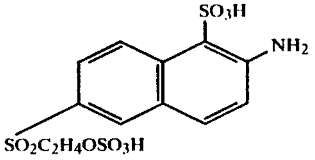 | 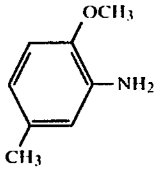 | 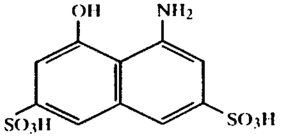 | 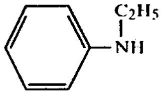 | 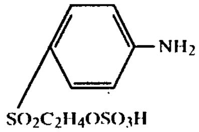 | Blue |
| 30 | " | " | " | 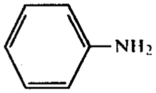 | 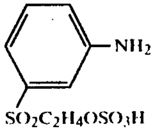 | " |
| 31 | 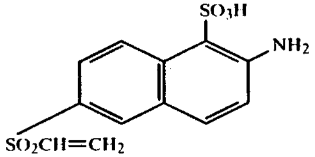 | " | 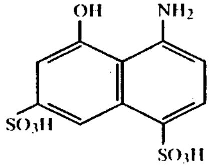 | 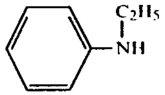 | " | " |
| 32 | " | " | 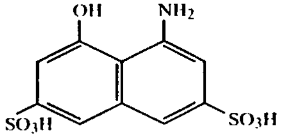 | 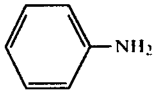 | 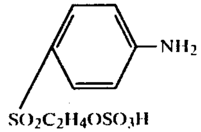 | " |
| 33 | 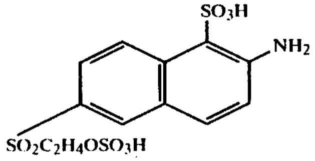 | 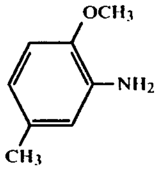 | 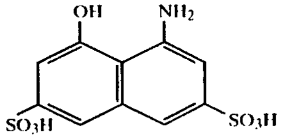 | 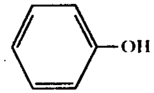 |  | Blue |
| 34 | " | " | 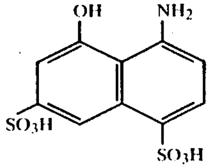 | 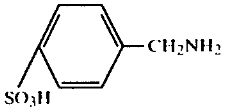 | 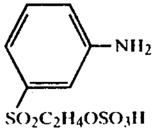 | " |

TABLE-continued
| 1 | 2 | 3 | 4 | 5 | 6 | 7 |
|---|---|---|---|---|---|---|
| 35 | 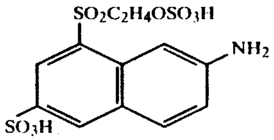 | " | 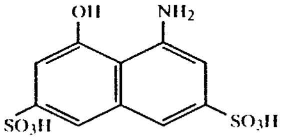 | 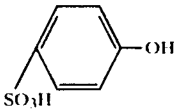 | " | " |
| 36 | " | " | " | 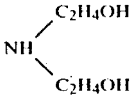 | 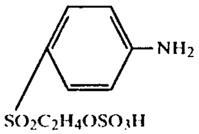 | " |

EXAMPLE 10

In a conventional manner, 2-naphthylamine-6-β-sulfatoethylsulfone-1-sulfonic acid (20.5 parts) was diazotized and then coupled with 5-methyl-2-methoxyaniline (6.85 parts) to obtain a monoazo compound.

On the other hand, 1-aminobenzene-2,4-disulfonic acid (13.8 parts) and cyanuric chloride (9.25 parts) were allowed to react with each other, followed by a condensation reaction with 1-amino-8-hydroxynaphthalene-3,6-disulfonic acid (16.0 parts). The condensate obtained was coupled with a diazonium compound of the above monoazo compound in a conventional manner. The resulting intermediate bisazo compound was then subjected to a substitution reaction with 1-aminobenzene-3-β-sulfatoethylsulfone (14.2 parts). The reaction mixture was conventionally after-treated including salting-out using sodium chloride to obtain a bisazo compound represented by the following formula in the free acid form.

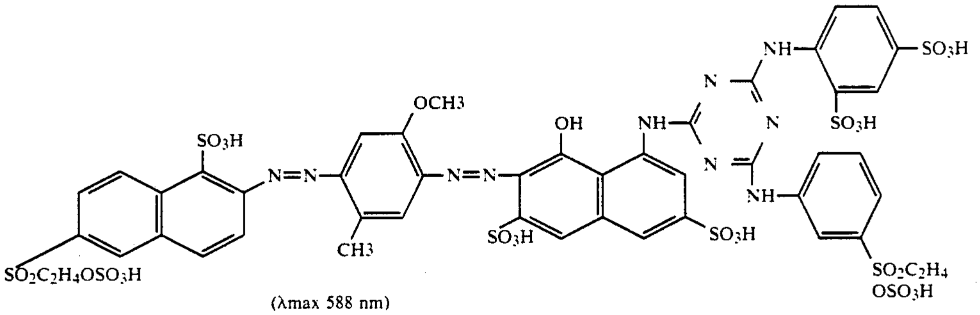

(λmax 588 nm)

EXAMPLE 11

Example 10 was repeated, except that the 2-aminonaphthalene-6-β-sulfatoethylsulfone-1-sulfonic acid, 5-methyl-2-methoxyaniline, 1-amino-8-hydroxynaphthalene-3,6-disulfonic acid, 1-aminobenzene-2,4-disulfonic acid and 1-aminobenzene-3-β-sulfatoethylsulfone were replaced by the compound shown in columns 2 to 6 of the following table, respectively, thereby obtaining a corresponding bisazo compound. The bisazo compound obtained was used to dye cellulose fibers to obtain a product dyed in a color shown in the table.

TABLE

| 1 | 2 | 3 | 4 | 5 | 6 | 7 |
|---|---|---|---|---|---|---|
| 1 | 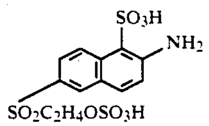 | 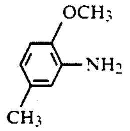 | 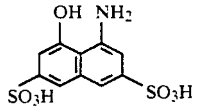 | 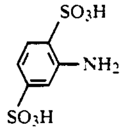 | 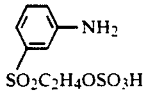 | Blue |
| 2 | " | " | " | " | 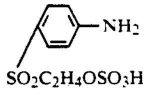 | " |
| 3 | " | " | 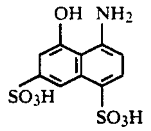 | 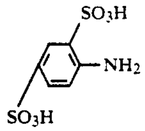 | " | " |
| 4 | " | " | 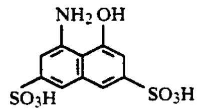 | 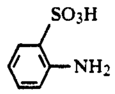 | 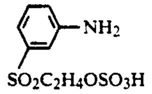 | " |
| 5 | 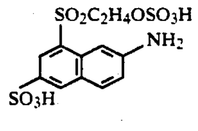 | 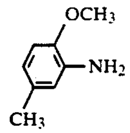 | 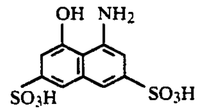 | 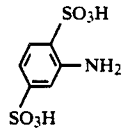 | 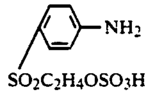 | Blue |
| 6 | " | " | " | 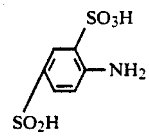 | 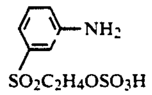 | " |

TABLE-continued

| 1 | 2 | 3 | 4 | 5 | 6 | 7 |
|---|---|---|---|---|---|---|
| 7 | " | " | " | 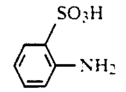 | 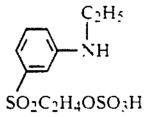 | " |
| 8 | 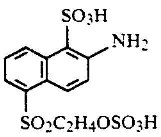 | " | 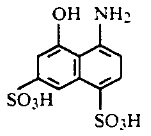 | 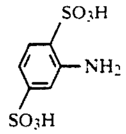 | 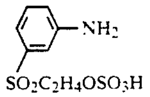 | " |
| 9 | 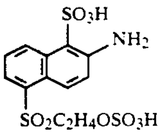 | 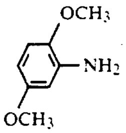 | 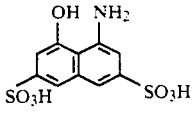 | 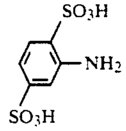 | 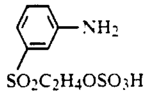 | Blue |
| 10 | 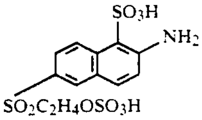 |  | " | " | 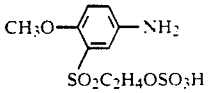 | " |
| 11 | " | 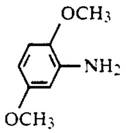 | " | 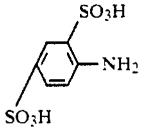 | 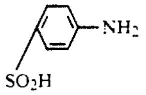 | " |
| 12 | 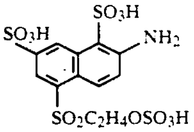 | 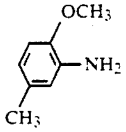 | " | 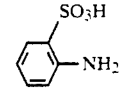 | 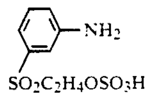 | " |

EXAMPLE 12

In a conventional manner, 2-naphthylamine-6-β-hydroxyethylsulfone-1-sulfonic acid (33.1 parts) was diazotized and then coupled with sodium aniline-ω-methanesulfonate (20.9 parts) and the coupling reaction mixture was made alkaline to perform hydrolysis. The reaction mixture was neutralized and conventionally after-treated including salting-out using sodium chloride to obtain a monoazo compound of the following formula in the free acid form.

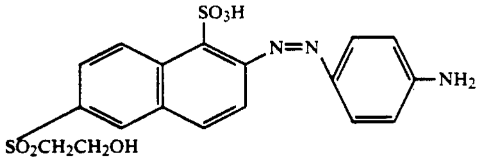

A mixture of the monoazo compound obtained (43.5 parts) and 20% oleum (80 parts by volume) was stirred at 60° C. to perform sulfonation. The reaction mixture was poured into ice water (400 parts) to deposit crystals, which were then collected on a suction filter to obtain a sulfonated monoazo compound of the following formula in the free acid form.

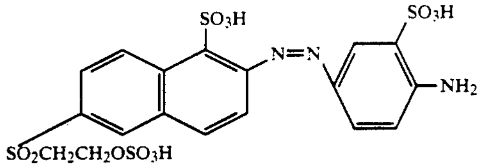

On the other hand, 6-amino-1-hydroxynaphthalene-3-sulfonic acid (23.9 parts) and cyanuric chloride (18.4 parts) were allowed to react with each other, followed by a condensation reaction with N-ethylaniline (12.0 parts). The resulting condensate was coupled with a diazonium salt of the above sulfonated monoazo compound, followed by a condensation reaction with 1-aminobenzene-3-β-sulfatoethylsulfone (28.3 parts). The reaction mixture was conventionally after-treated including salting-out using sodium chloride to obtain a bisazo compound of the following formula in the free acid form.

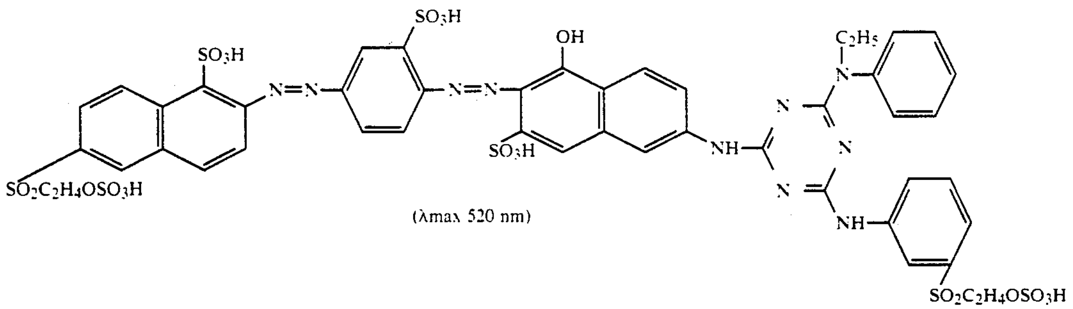

(λmax 520 nm)

EXAMPLE 13

Example 12 was repeated, except that the 2-naphthylamine-6-β-hydroxyethylsulfone-1-sulfonic acid, sodium aniline-ω-methanesulfonate, 6-amino-1-hydroxynaphthalene-3-sulfonic acid, N-ethylaniline and 1-aminobenzene-3-β-sulfatoethylsulfone were replaced by the compounds shown in columns 2 to 6 of the following table, and the hydrolysis was omitted, when the compound shown in the column 3 of the table was not an ω-methanesulfonic acid compound. Thus, a corresponding bisazo compound was obtained, and used to dye cellulose fiber materials to obtain a product dyed in a color shown in a column 7 of the table.

TABLE
| 1 | 2 | 3 | 4 | 5 | 6 | 7 |
|---|---|---|---|---|---|---|
| 1 | 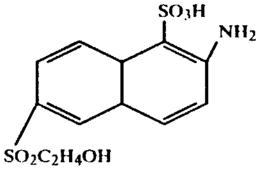  | 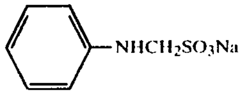  | 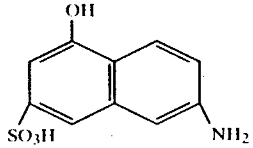  | 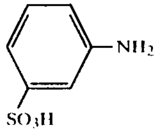  | 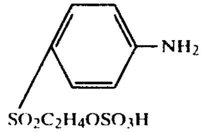  | Red |
| 2 | " | 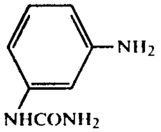  | " | 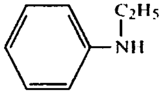  | 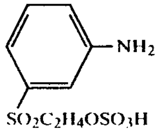  | " |
| 3 | " | 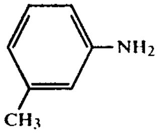  | " | " | " | " |
| 4 | " | " | " | 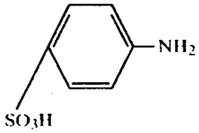  | " | " |
| 5 | 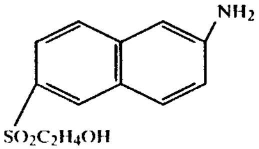  | 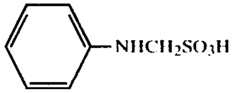  | 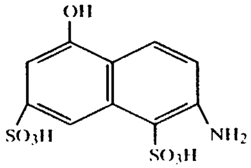  | 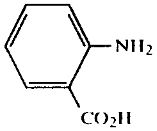  | 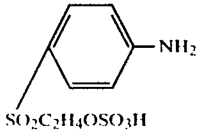  | Red |
| 6 | " | 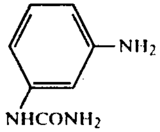  | " | 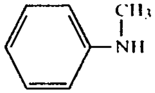  | " | " |

TABLE-continued
| 1 | 2 | 3 | 4 | 5 | 6 | 7 |
|---|---|---|---|---|---|---|
| 7 | " | 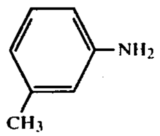 | 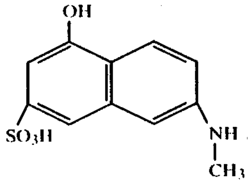 | 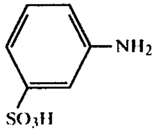 | " | " |
| 8 | " | 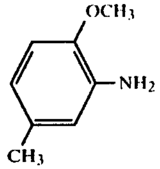 | 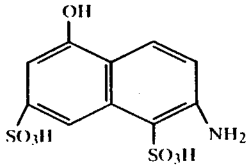 | $CH_3$<br>\|<br>$NH-C_2H_4-SO_3H$ | " | " |
| 9 | 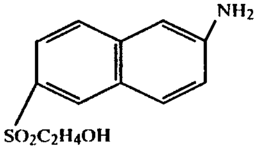 | 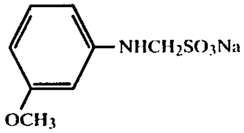 | 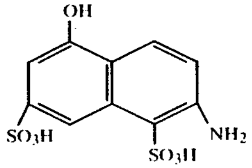 | $NH_2C_2H_4CO_2H$ | 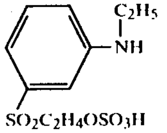 | Red |
| 10 | 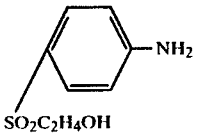 | 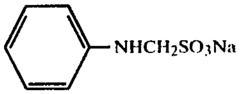 | 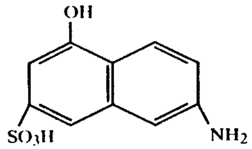 | $CH_3$<br>\|<br>$NHC_2H_4SO_3H$ | 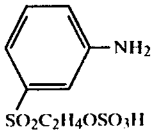 | " |
| 11 | 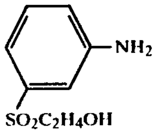 | " | " | 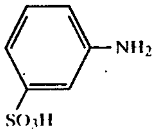 | " | " |
| 12 | 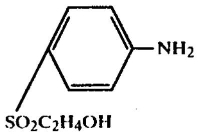 | 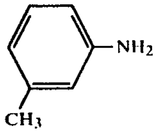 | " | " | 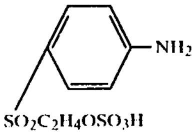 | " |

TABLE-continued
| 1 | 2 | 3 | 4 | 5 | 6 | 7 |
|---|---|---|---|---|---|---|
| 13 |  | 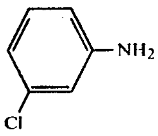 | 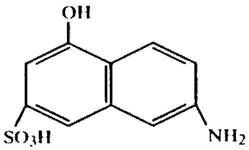 | $NH_2C_2H_4SO_3H$ | 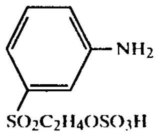 | Red |
| 14 | 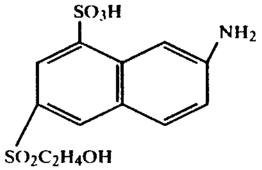 | 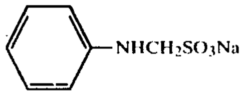 | " | 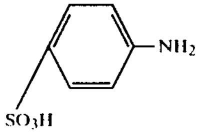 | " | " |
| 15 | 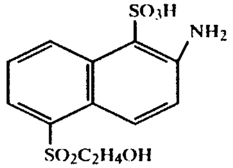 | " | " | 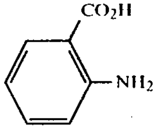 |  | " |
| 16 | 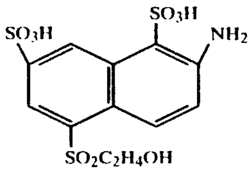 | " | " | 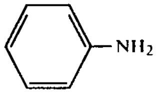 | $NH_2C_2H_4OC_2H_4SO_2C_2H_4Cl$ | " |
| 17 | 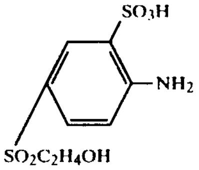 | 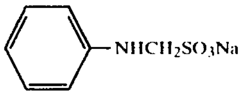 | 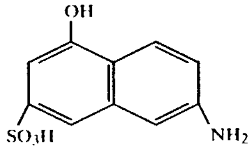 | $CH_3$—N(H)—$C_2H_4SO_3H$ | 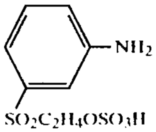 | Red |

TABLE-continued
| 1 | 2 | 3 | 4 | 5 | 6 | 7 |
|---|---|---|---|---|---|---|
| 18 | 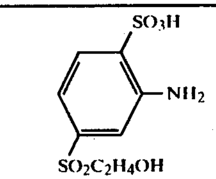 | " | " | " | 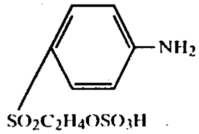 | " |
| 19 | 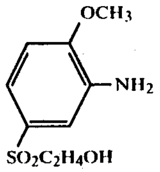 | " | " | " | " | " |
| 20 | 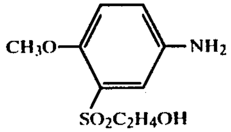 | " | " | " | " | " |
| 21 | 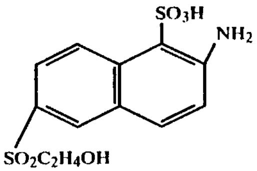 | 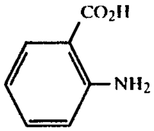 | 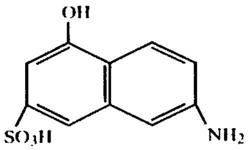 | 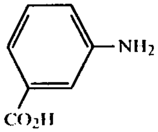 | 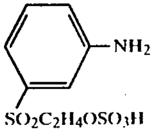 | Red |
| 22 | 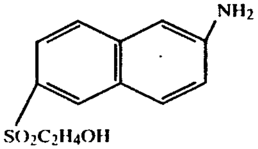 | " | " | $NH_2CH_2CO_2H$ | " | " |
| 23 | 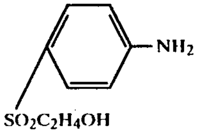 | " | " | $NH_2C_2H_4SO_3H$ | 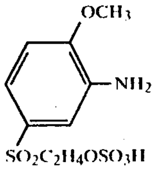 | " |

TABLE-continued
| 1 | 2 | 3 | 4 | 5 | 6 | 7 |
|---|---|---|---|---|---|---|
| 24 | " | 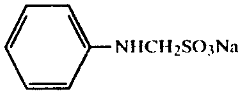 | 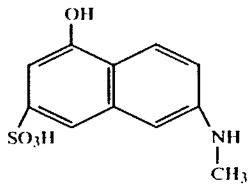 | " | 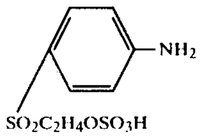 | " |
| 25 | 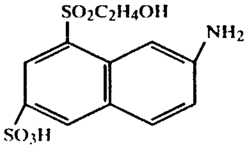 | 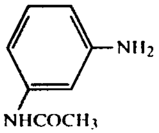 | 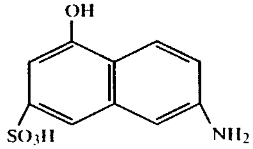 | 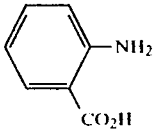 | 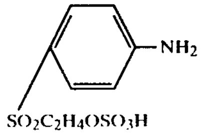 | Red |
| 26 | " | 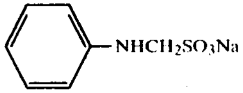 | " | $CH_3$<br>\|<br>$NH-C_2H_4SO_3H$ | " | " |
| 27 | 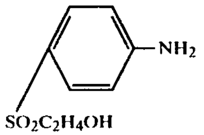 | 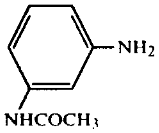 | 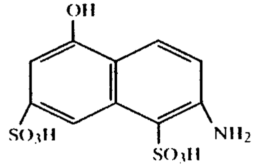 | " | 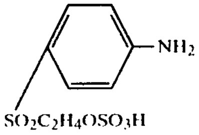 | " |
| 28 | 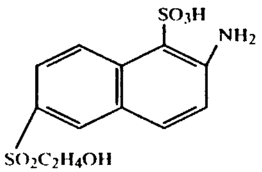 | " | " | " | " | " |
| 29 | 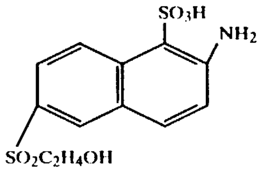 | 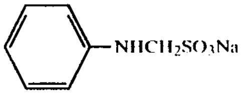 | 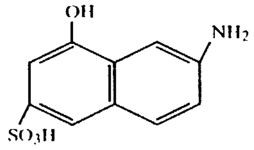 | $CH_3$<br>\|<br>$N-C_2H_4SO_3H$ | 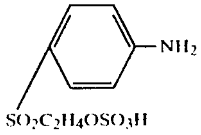 | Dull red |

TABLE-continued
| 1 | 2 | 3 | 4 | 5 | 6 | 7 |
|---|---|---|---|---|---|---|
| 30 | 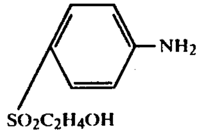 | " | " | " | " | " |
| 31 | 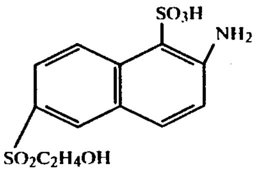 | 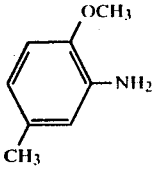 | 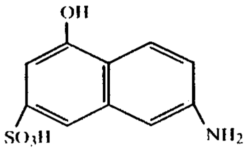 | $NH_2-CH(CH_3)-CO_2H$ | $NH_2C_2H_4SO_2C_2H_4Cl$ | Red |
| 32 | 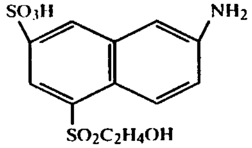 | 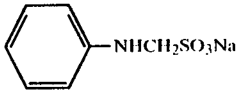 | " | 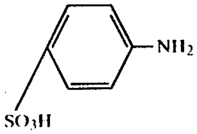 | 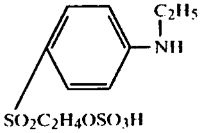 | " |

EXAMPLE 14

Each bisazo compound described in Examples 8 to 13 (each 0.1, 0.3 and 0.6 part) was dissolved in water (200 parts), and sodium sulfate (10 parts) and cotton (10 parts) were added thereto. The bath was heated to 60° C., and then sodium carbonate (4 parts) was added thereto. Dyeing was continued for 1 hour at that temperature. Thereafter, the cotton was removed out washed with water, soaped, washed with water and then dried to obtain each dyed product of a blue or red color superior in fastness properties with a superior build-up property.

EXAMPLE 15

Using each bisazo compound described in Examples 8 to 13, color pastes having the following composition were prepared.

| | |
|---|---|
| Bisazo compound | 5 Parts |
| Urea | 5 Parts |
| Sodium alginate (5%) stock paste | 50 Parts |
| Hot water | 25 Parts |
| Sodium hydrogencarbonate | 2 Parts |
| Water (balance) | 13 Parts |

Mercerized cotton broad cloth was printed with the color paste of the above composition, pre-dried, steamed at 100° C. for 5 minutes, washed with hot water, soaped, again washed with hot water, and then dried to obtain a product printed in a blue or red color superior in various fastness properties.

EXAMPLE 16

In a conventional manner. 2-aminonaphthalene-8-sulfatoethylsulfone-6-sulfonic acid (41.1 parts) was diazotized and then coupled with 1-aminonaphthalene-7-sulfonic acid (22.3 parts) to obtain a monoazo compound, and the monoazo compound obtained was diazotized and coupled with m-toluidine (10.7 parts).

The intermediate bisazo compound obtained and cyanuric chloride (18.4 parts) were allowed to react with each other, followed by a condensation reaction with aniline (9.3 parts). The condensate obtained was then subjected to a reaction with 1-aminobenzene-3-β-sulfatoethylsulfone (28.1 parts) at 60° to 80° C., and the reaction mixture was conventionally after-treated including salting-out using sodium chloride to obtain a bisazo compound represented by the following formula in the free acid form.

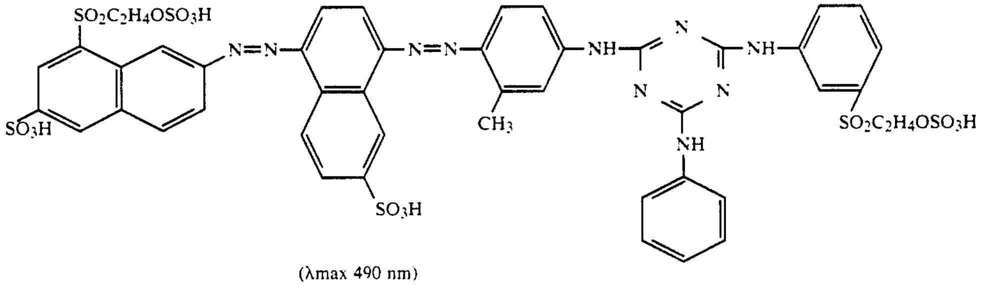

(λmax 490 nm)

EXAMPLE 17

Example 16 was repeated, that the 2-aminonaphthalene-8-β-sulfatoeothylsulfone-6-sulfonic acid, 1-aminonaphthalene-7-sulfonic acid, m-toluidine, aniline and 1-aminobenzene-3-β-sulfatoethylsulfone were replaced by the compounds shown in columns 2 to 6 of the following table, respectively, thereby obtaining a corresponding bisazo compound. The bisazo compound obtained was used to dye cellulose fibers to obtain a product dyed in a color shown in a column 7 of the table.

TABLE
| 1 | 2 | 3 | 4 | 5 | 6 | 7 |
|---|---|---|---|---|---|---|
| 1 | 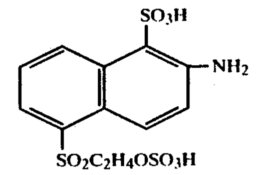 | 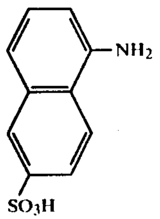 | 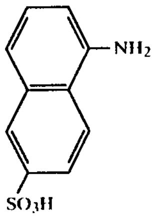 | 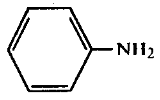 | 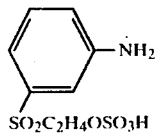 | Reddish brown |
| 2 | 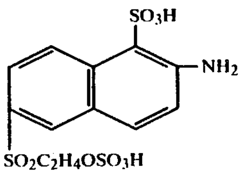 | 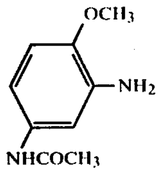 | 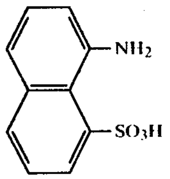 | 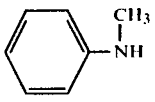 | 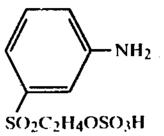 | Yellowish brown |
| 3 | 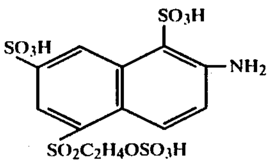 | 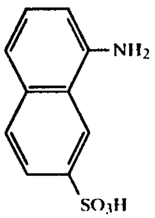 | 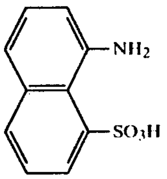 | 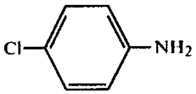 | 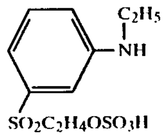 | Reddish brown |
| 4 | 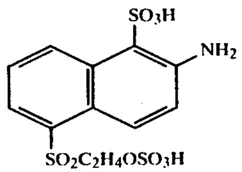 | 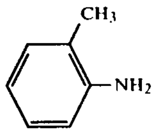 | 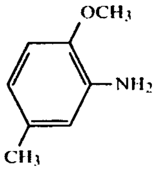 | 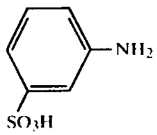 | 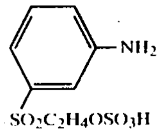 | Yellow |

TABLE-continued
| 1 | 2 | 3 | 4 | 5 | 6 | 7 |
|---|---|---|---|---|---|---|
| 5 | 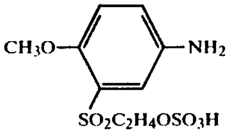 | 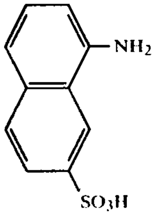 | 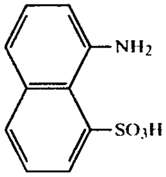 | 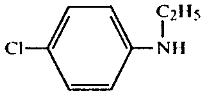 | 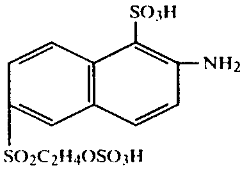 | Reddish brown |
| 6 | 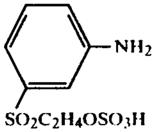 | 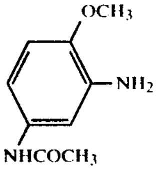 | 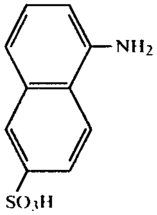 | 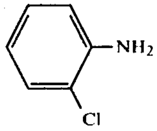 | 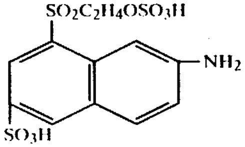 | Yellowish brown |
| 7 | 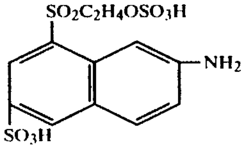 | 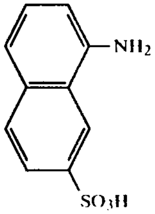 | 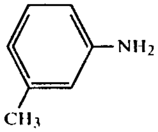 | 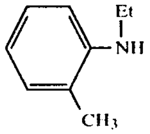 | 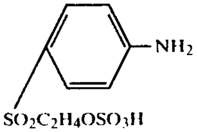 | Reddish brown |
| 8 | 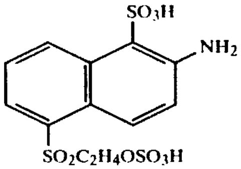 | 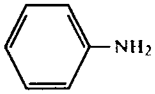 | 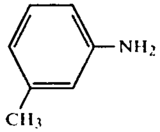 | 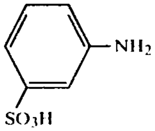 | 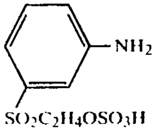 | Yellow |

TABLE-continued
| 1 | 2 | 3 | 4 | 5 | 6 | 7 |
|---|---|---|---|---|---|---|
| 9 | 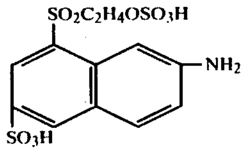 | 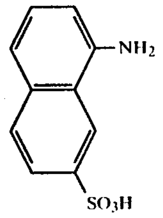 | 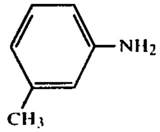 | 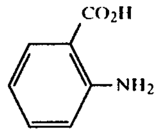 | 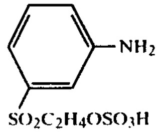 | Reddish brown |
| 10 | " | " | 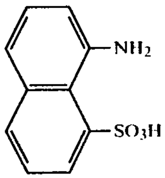 | 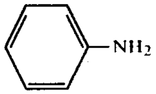 | " | " |
| 11 | " | " | " | 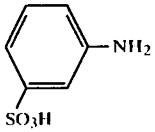 | " | " |
| 12 | " | " | " | 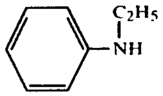 | " | " |
| 13 | 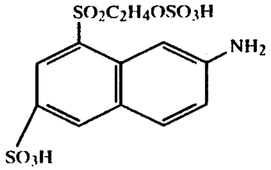 | 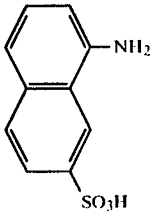 | 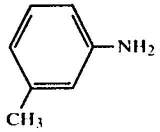 | 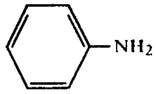 | 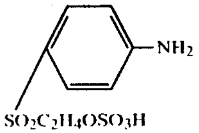 | Reddish brown |

TABLE-continued
| 1 | 2 | 3 | 4 | 5 | 6 | 7 |
|---|---|---|---|---|---|---|
| 14 | " | " | " | " | 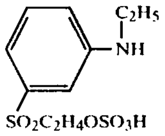 | " |
| 15 | " | " | " | 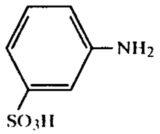 | 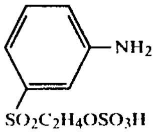 | " |
| 16 | " | " | " | 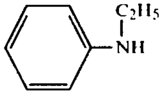 | " | " |
| 17 | 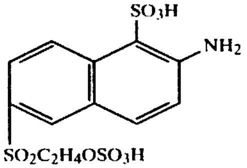 | 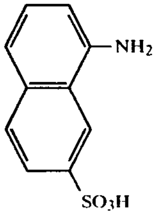 | 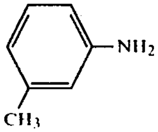 | 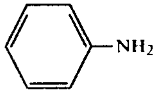 | 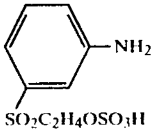 | Reddish brown |
| 18 | " | " | " | 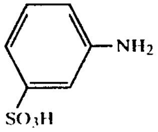 | " | " |
| 19 | " | " | " | 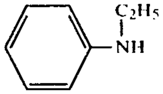 | 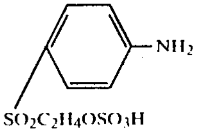 | " |

TABLE-continued
| 1 | 2 | 3 | 4 | 5 | 6 | 7 |
|---|---|---|---|---|---|---|
| 20 | " | " | " | 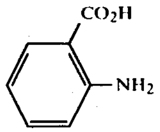 |  | " |
| 21 | 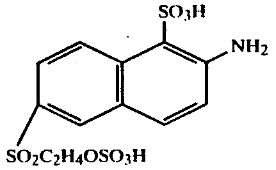 | 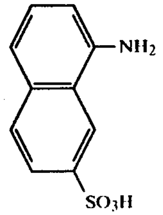 | 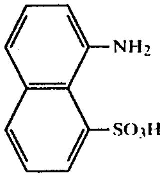 | 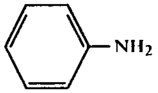 | 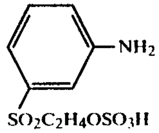 | Reddish brown |
| 22 | " | " | " | " | 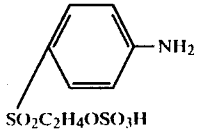 | " |
| 23 | " | " | " | 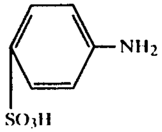 | 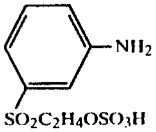 | " |
| 24 | " | " | " | 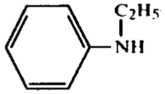 | " | " |
| 25 |  | 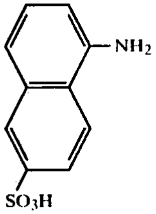 | 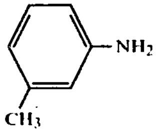 | 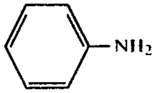 | 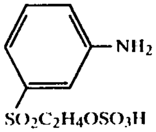 | Reddish brown |

TABLE-continued
| 1 | 2 | 3 | 4 | 5 | 6 | 7 |
|---|---|---|---|---|---|---|
| 26 | " | " | " | 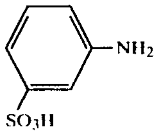 | " | " |
| 27 | " | " | 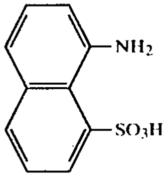 | 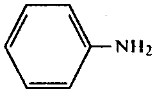 | 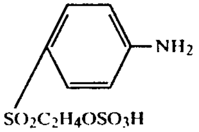 | " |
| 28 | " | " | " | 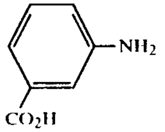 | 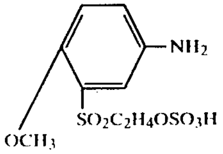 | " |
| 29 | 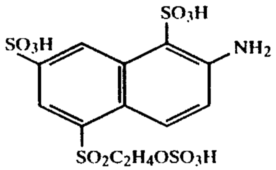 | 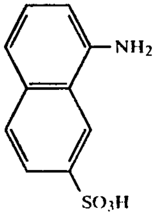 | 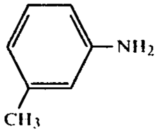 | 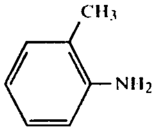 | 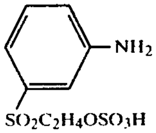 | Reddish brown |
| 30 | " | " | " | 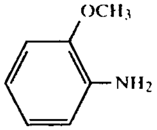 | " | " |

TABLE-continued
| 1 | 2 | 3 | 4 | 5 | 6 | 7 |
|---|---|---|---|---|---|---|
| 31 | 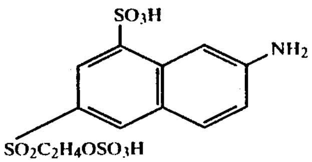 | " | " | 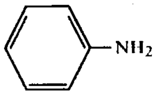 | " | " |
| 32 | 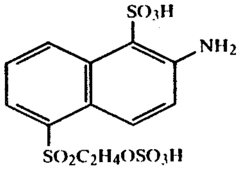 | " | " | " | 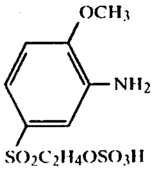 | " |
| 33 | 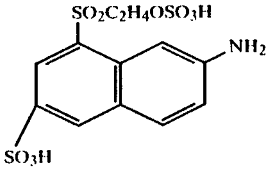 | 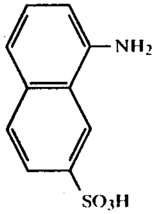 | 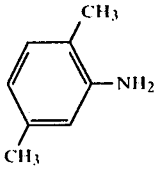 | 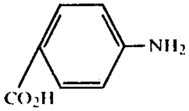 | 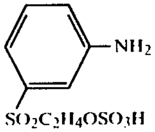 | Reddish brown |
| 34 | " | " | " | 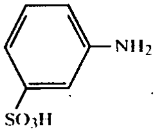 | " | " |
| 35 | " | " |  | 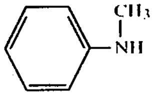 | " | " |

TABLE-continued
| 1 | 2 | 3 | 4 | 5 | 6 | 7 |
|---|---|---|---|---|---|---|
| 36 | " | 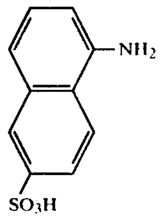 | 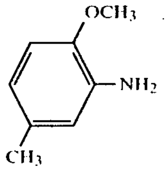 | 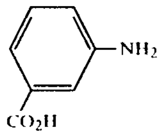 | 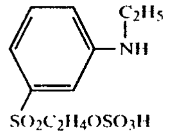 | " |
| 37 | 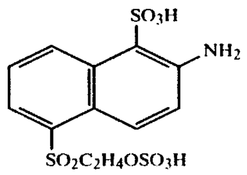 | 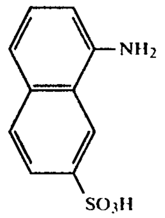 | 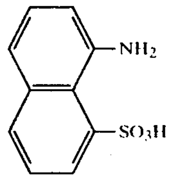 | 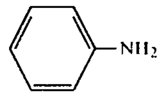 | 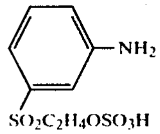 | Reddish brown |
| 38 | " | 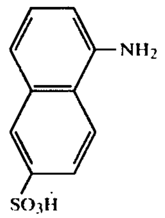 | 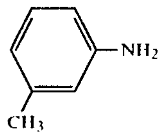 | 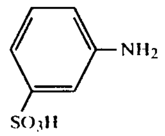 | 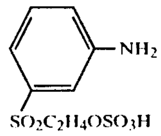 | " |
| 39 | 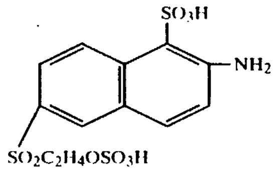 | " | " | " | " | " |

TABLE-continued
| 1 | 2 | 3 | 4 | 5 | 6 | 7 |
|---|---|---|---|---|---|---|
| 40 | 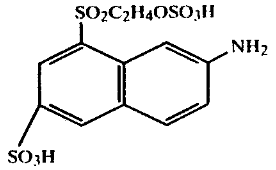 | " | " | " | " | " |
| 41 | 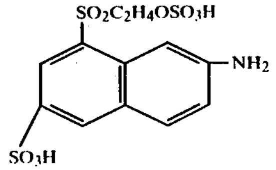 | 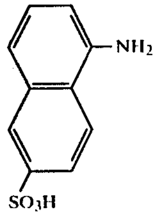 | 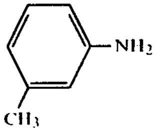 | 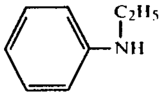 | 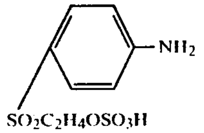 | Reddish brown |
| 42 | " | " | 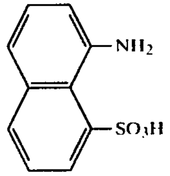 | 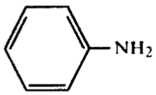 | 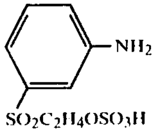 | " |
| 43 | 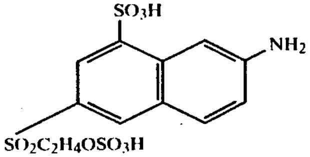 | " | 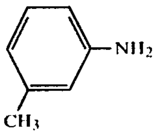 | 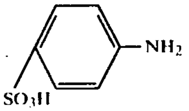 | " | " |
| 44 | " | 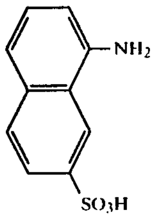 | " | 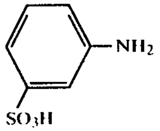 | " | " |

EXAMPLE 18

In a conventional manner, 2-aminonaphthalene-8-β-sulfatoethylsulfone-6-sulfonic acid (41.1 parts) was diazotized and then coupled with 1-aminonaphthalene-7-sulfonic acid (22.3 parts), and the monoazo compound obtained was diazotized and coupled with 2,5-xylidine (12.1 parts) to obtain an intermediate bisazo compound.

On the other hand, cyanuric chloride (18.4 parts) and 1-aminobenzene-2,5-disulfonic acid (25.3 parts) were allowed to react with each other. The resulting condensate was subjected to a condensation reaction with the above intermediate bisazo compound, followed by a reaction with 1-aminobenzene-3--β-sulfatoethylsulfone (28.1 parts), at 60° to 80° C. The reaction mixture was conventionally after-treated in including salting-out using sodium chloride to obtain a bisazo compound represented by the following formula in the free acid form.

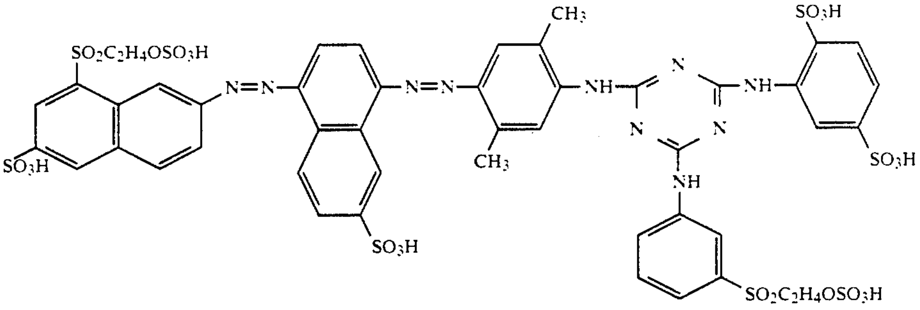

(λmax 485 nm)

EXAMPLE 19

Example 18 was repeated, except that the 2-aminonaphthalene-8-β-sulfatoethylsulfone-6-sulfonic acid, 1-aminonaphthalene-7-sulfonic acid, 2,5-xylidine, 1-aminobenzene-2,5-disulfonic acid and 1-aminobenzene-3-β-sulfatoethylsulfone were replaced by the compounds shown in columns 2 to 6 of the following table, respectively, thereby obtaining a corresponding bisazo compound. The bisazo compound obtained was used to dye cellulose fibers to obtain a product dyed in a color shown in a column 7 of the table.

TABLE

| 1 | 2 | 3 | 4 | 5 | 6 | 7 |
|---|---|---|---|---|---|---|
| 1 | 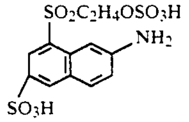 | 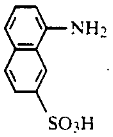 | 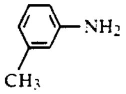 | 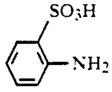 | 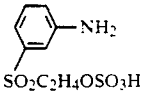 | Reddish brown |
| 2 | " | " | " | 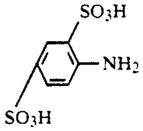 | " | " |
| 3 | " | " | " | 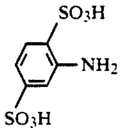 | " | " |
| 4 | " | " | " | " | 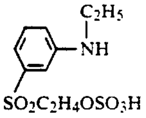 | " |
| 5 | 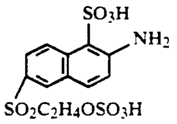 | 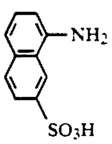 | 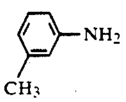 | 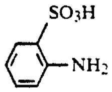 | 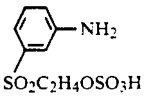 | Reddish brown |

TABLE-continued
| 1 | 2 | 3 | 4 | 5 | 6 | 7 |
|---|---|---|---|---|---|---|
| 6 | " | " | " | 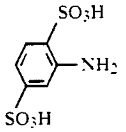  | " | " |
| 7 | " | " | " | 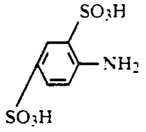  | " | " |
| 8 | " | " | 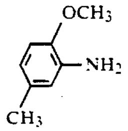  | 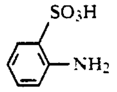  | 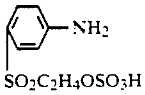  | " |
| 9 | 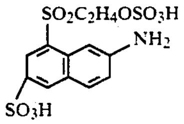  | 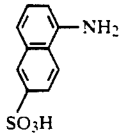  | 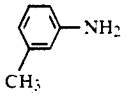  | 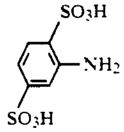  | 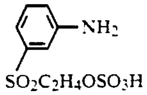  | Reddish brown |
| 10 | " | 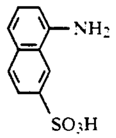  | " | " | 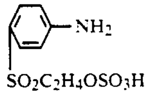  | " |
| 11 | " | " | 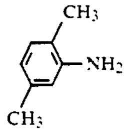  | 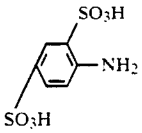  | 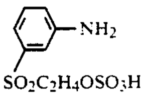  | " |
| 12 | 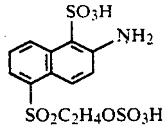  | " | 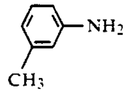  | " | " | " |
| 13 | 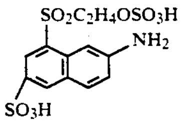  | 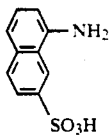  | 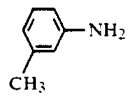  | 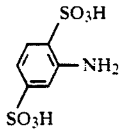  | $NH_2C_2H_4OC_2H_4$ $SO_2CH{=}CH_2$ | Reddish brown |
| 14 | " | 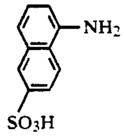  | " | 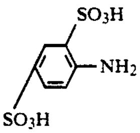  | 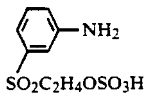  | " |
| 15 | 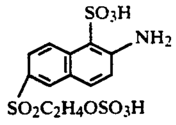  | " | " | " | " | " |
| 16 | " | " | " | 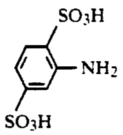  | 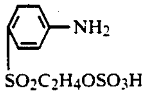  | " |

TABLE-continued

| 1 | 2 | 3 | 4 | 5 | 6 | 7 |
|---|---|---|---|---|---|---|
| 17 | 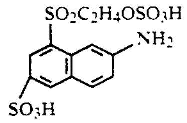 | 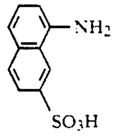 | 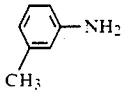 | 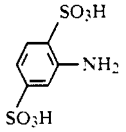 | 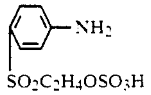 | Reddish brown |
| 18 | " | " | " | " | 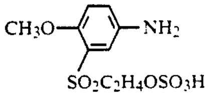 | " |
| 19 | 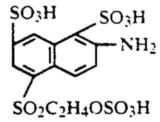 | " | " | 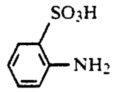 | 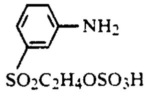 | " |
| 20 | 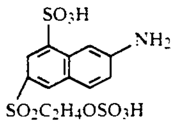 | " | " | 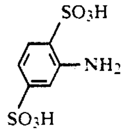 | " | " |

EXAMPLE 20

Examples 17 and 19 were repeated, except that the compound shown in the column 5 of both tables was replaced by the compounds described below, thereby obtaining a corresponding bisazo compound.

2-, 3- or 4-sulfophenol
2,5- or 2,4-disulfophenol benzylamine
2-, 3- or 4-sulfobenzylamine taurine
N-methyltaurine
$\beta$-alanine
mono- or di-ethanolamine

EXAMPLE 21

Each bisazo compound described in Examples 16 to 20 (each 0.1, 0.3 and 0.6 parts) was dissolved in water (200 parts), and sodium sulfate (10 parts) and cotton (10 parts) were added thereto. The bath was heated to 60° C., and then sodium carbonate (4 parts) was added thereto. Dyeing was continued for 1 hour at that temperature. Thereafter, the cotton was removed and washed with water, soaped, washed with water and then dried to obtain each dyed product of a yellow to brown color superior in fastness properties with a superior build-up property.

EXAMPLE 22

Using each bisazo compound described in Examples 16 to 20, color pastes having the following composition were prepared.

| | |
|---|---|
| Bisazo compound | 5 Parts |

-continued

| | |
|---|---|
| Urea | 5 Parts |
| Sodium alginate (5%) stock paste | 50 Parts |
| Hot water | 25 Parts |
| Sodium hydrogencarbonate | 2 Parts |
| Water (balance) | 13 Parts |

Mercerized cotton board cloth was printed with the color pastes of the above composition, pre-dried, steamed at 100° C. for 5 minutes, washed with hot water, soaped, again washed with hot water, and then dried to obtain a product printed in a yellow to brown color superior in various fastness properties.

EXAMPLE 23

In a conventional manner, 2-naphthylamine-5-$\beta$-sulfatoethylsulfone-1-sulfonic acid (20.5 parts) was diazotized and coupled with 5-methyl-2-methoxyaniline (6.85 parts), and the resulting monoazo compound was diazotized and coupled with 5-methyl-2-ethoxyaniline (7.55 parts) to obtain a bisazo compound.

On the other hand, 1-amino-8-hydroxynaphthalene-3,6-disulfonic acid (16.0 parts) and cyanuric chloride (9.25 parts) were allowed to react with each other, followed by a condensation reaction with 1-aminobenzene-3-$\beta$-sulfatoethylsulfone (14.2 parts). The resulting condensate was coupled with a diazonium compound of the above bisazo compound in a usual manner, followed by a reaction with N-ethylaniline (6.0 parts). The reaction mixture was conventionally after-treated including salting-out using sodium chloride to obtain a triazo compound represented by the following formula in the free acid form.

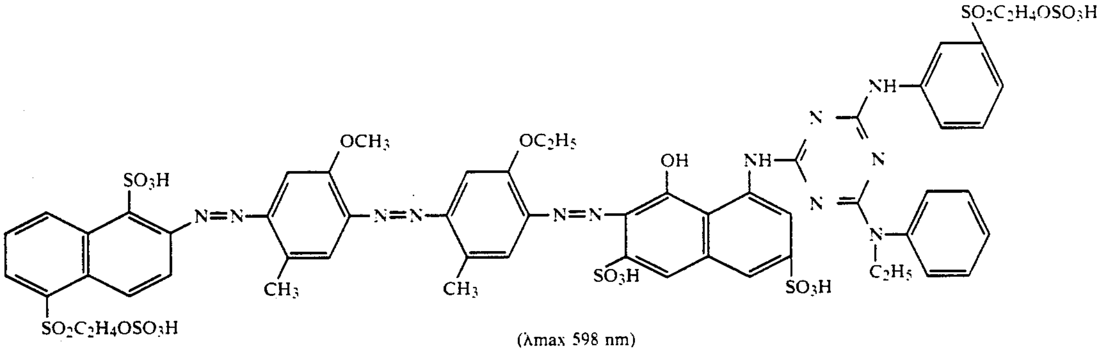

(λmax 598 nm)

EXAMPLE 24

Example 23 was repeated, except that the 2-naphthylamine-5-β-sulfatoethylsulfone-1-sulfonic acid, 5-methyl-2-methoxyaniline, 5-methyl-2-ethoxyaniline, 1-amino-8-hydroxynaphthalene-3,6-disulfonic acid, N-ethylamine and 1-aminobenzene-3-β-sulfatoethylsulfone were replaced by the compounds shown in columns 2 to 7 of the following table, respectively, thereby obtaining a corresponding trisazo compound. The trisazo compound obtained was used to dye cellulose fibers to obtain a product dyed in a color shown in a column 8 of the table.

TABLE
| 1 | 2 | 3 | 4 | 5 | 6 | 7 | 8 |
|---|---|---|---|---|---|---|---|
| 1 | 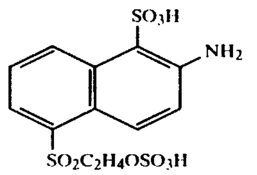 | 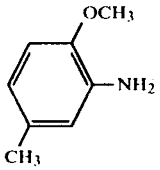 | 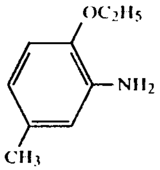 | 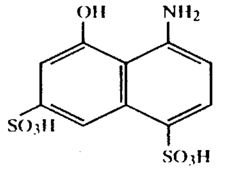 | 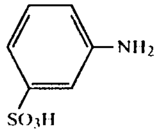 | 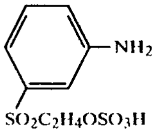 | Greenish navy blue |
| 2 | 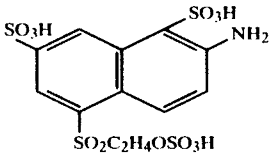 | 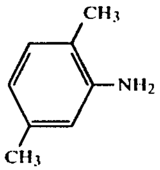 | 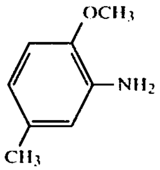 | 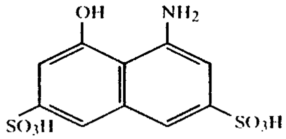 | 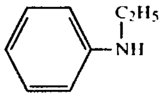 | 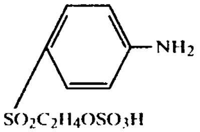 | Navy blue |
| 3 | 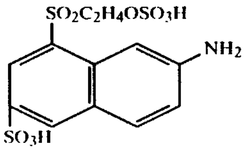 | 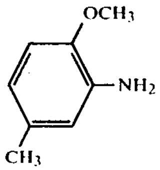 | 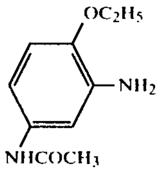 | 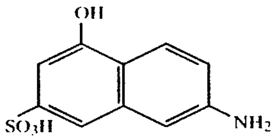 | 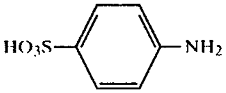 | 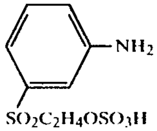 | Navy blue |
| 4 | 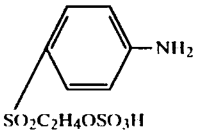 | 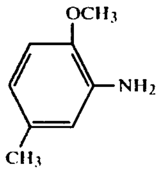 | 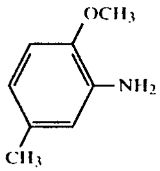 | 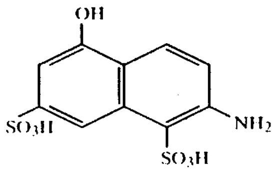 | 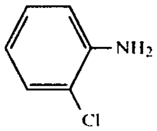 | 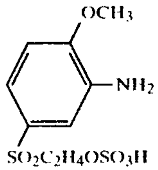 | Reddish navy blue |
| 5 | 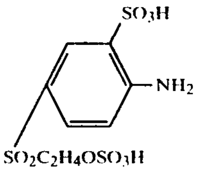 | 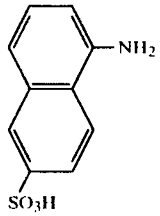 | 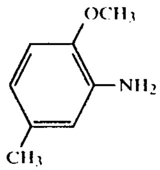 | 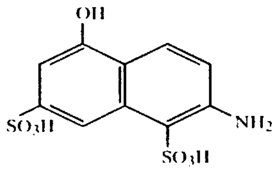 | 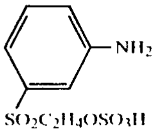 | 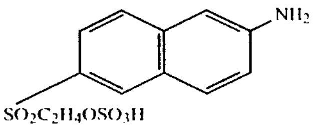 | Reddish navy blue |

TABLE-continued
| 1 | 2 | 3 | 4 | 5 | 6 | 7 | 8 |
|---|---|---|---|---|---|---|---|
| 6 | 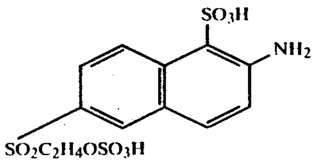 | 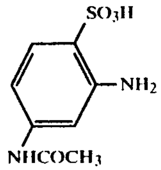 | 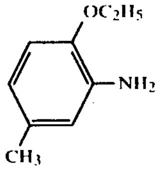 | 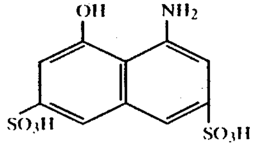 | 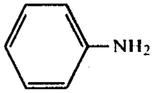 | 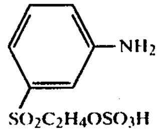 | Navy blue |
| 7 | 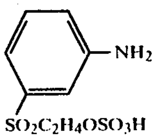 | 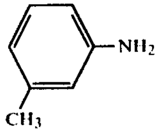 | 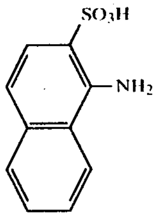 | 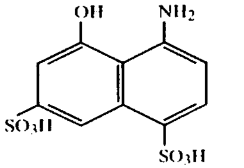 | 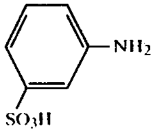 | 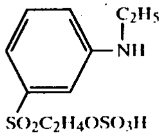 | Navy blue |
| 8 | 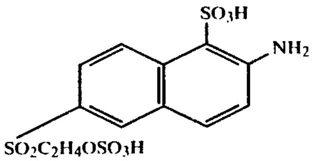 | 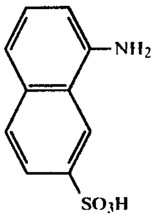 | 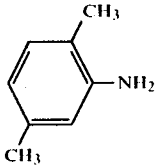 | 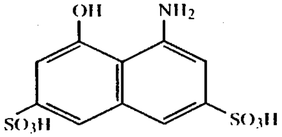 | 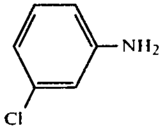 | 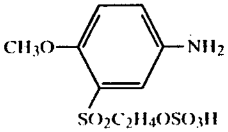 | Navy blue |
| 9 | 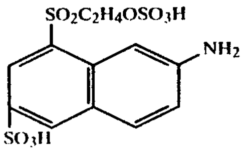 | 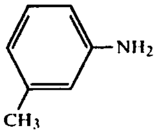 | 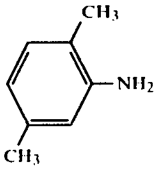 | 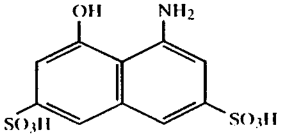 | 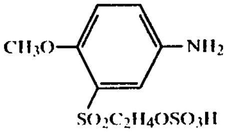 | 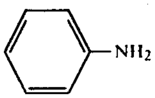 | Navy blue |
| 10 | 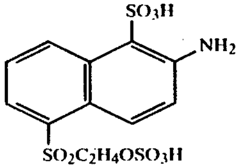 | 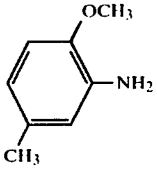 | 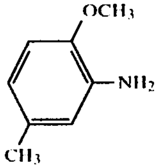 | 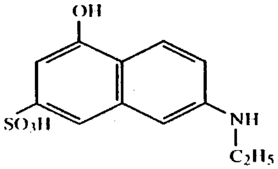 | 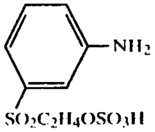 | 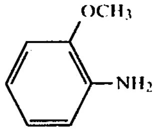 | Reddish navy blue |

TABLE-continued
| 1 | 2 | 3 | 4 | 5 | 6 | 7 | 8 |
|---|---|---|---|---|---|---|---|
| 11 | 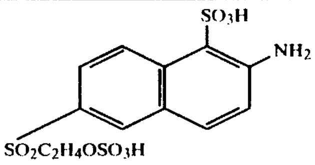 | 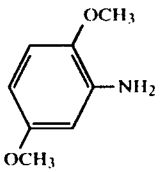 | 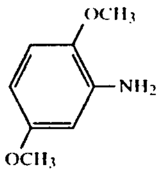 | 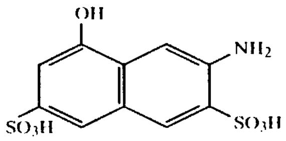 | 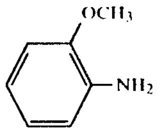 | 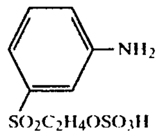 | Greenish navy blue |
| 12 |  | 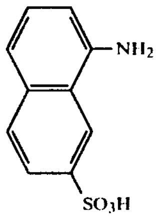 | 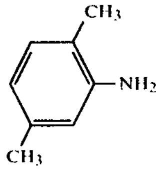 | 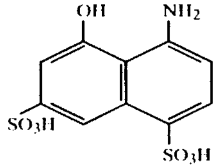 | 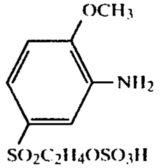 | 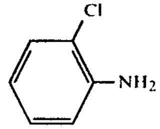 | Navy blue |
| 13 | 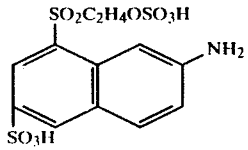 | 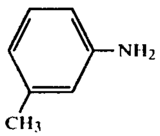 | 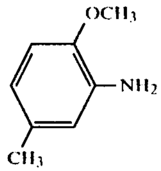 | 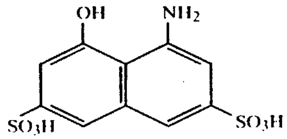 | 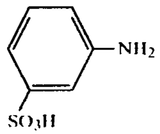 | 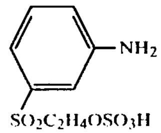 | Navy blue |
| 14 | " | " | " | " | 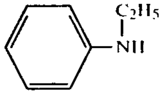 | " | Navy blue |
| 15 | " | 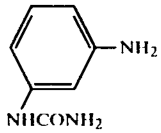 | " | " | 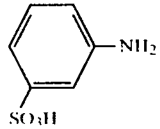 | 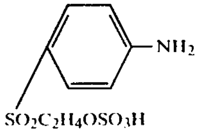 | Navy blue |
| 16 | " | " | " | " | 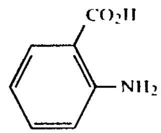 | 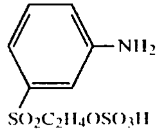 | Navy blue |

TABLE-continued
| 1 | 2 | 3 | 4 | 5 | 6 | 7 | 8 |
|---|---|---|---|---|---|---|---|
| 17 | 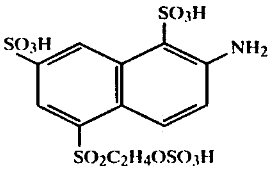 | 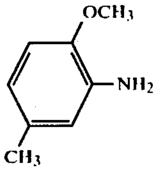 | 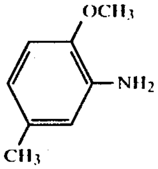 | 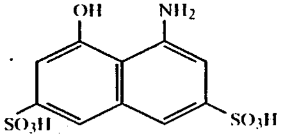 | 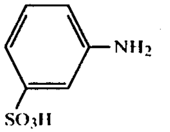 | 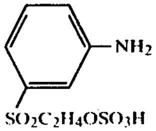 | Navy blue |
| 18 | ″ | ″ | ″ | ″ | 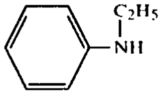 | ″ | Navy blue |
| 19 | ″ | ″ | ″ | ″ | 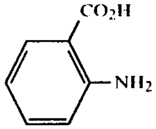 | ″ | Navy blue |
| 20 | 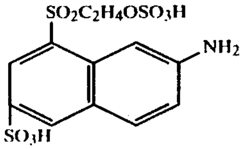 | 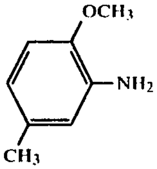 | 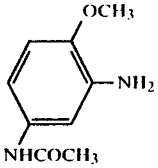 | ″ | 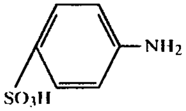 | 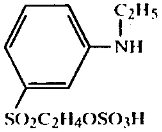 | Navy blue |
| 21 | 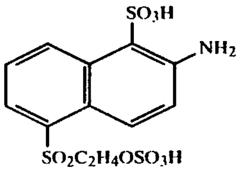 | 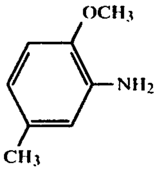 | 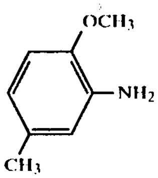 | 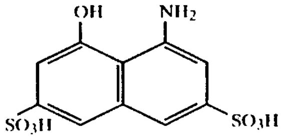 | $NH_2C_2H_4SO_3H$ | 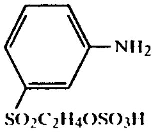 | Navy blue |
| 22 | 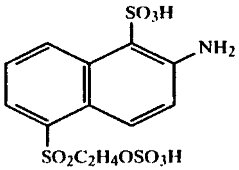 | 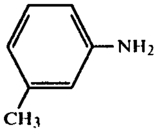 | 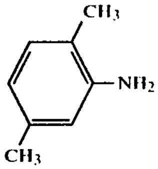 | ″ | $NH_2C_2H_4CO_2H$ | ″ | Navy blue |

TABLE-continued
| 1 | 2 | 3 | 4 | 5 | 6 | 7 | 8 |
|---|---|---|---|---|---|---|---|
| 23 | 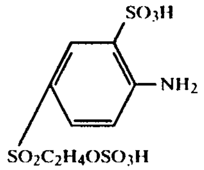 | 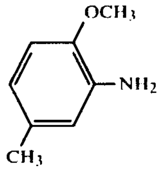 | 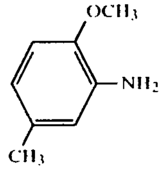 | " | $CH_3$—N(H)—$C_2H_4SO_3H$ | 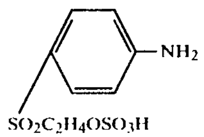 | Navy blue |
| 24 | " | " | 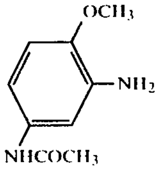 | " | $NH_2C_2H_4SO_3H$ | 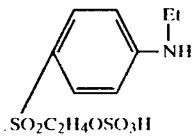 | Navy blue |
| 25 | 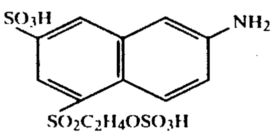 | 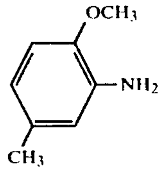 | 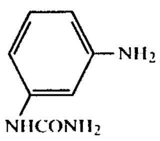 | 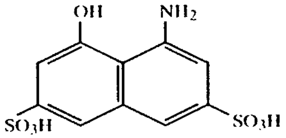 | 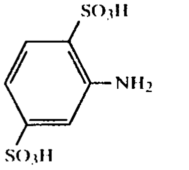 | 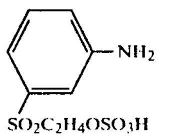 | Navy blue |
| 26 | 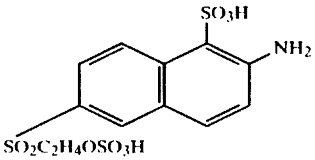 | 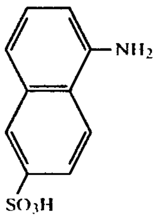 | 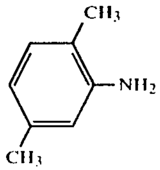 | 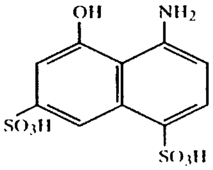 | 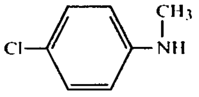 | " | Navy blue |
| 27 | " | " | " | 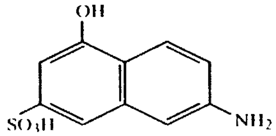 | 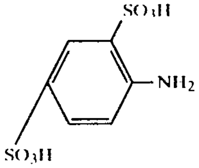 | 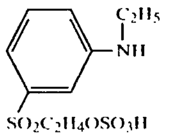 | Reddish navy blue |

TABLE-continued
| 1 | 2 | 3 | 4 | 5 | 6 | 7 | 8 |
|---|---|---|---|---|---|---|---|
| 28 | " | 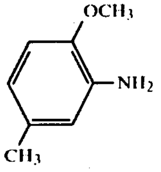 | 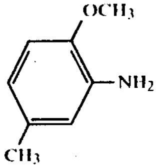 | 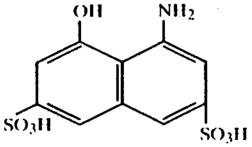 | 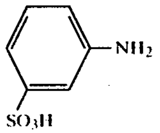 | 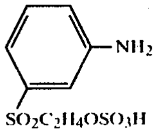 | Navy blue |
| 29 | 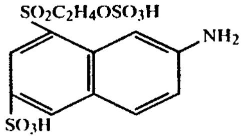 | 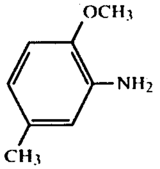 | 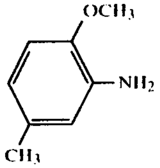 | 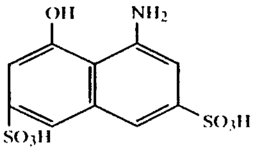 | 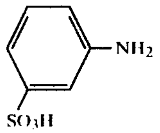 | 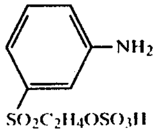 | Navy blue |
| 30 | " | " | " | " | $NH_2C_2H_4OC_2H_4SO_2CH{=}CH_2$ | 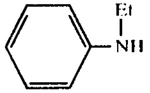 | Navy blue |
| 31 | " | " | " | 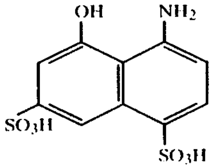 | 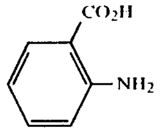 | 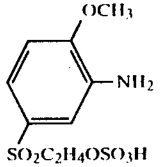 | Reddish navy blue |
| 32 | " | " | " | 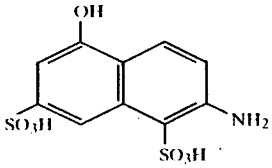 | 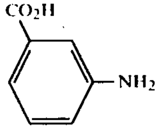 | 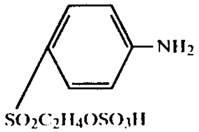 | Reddish navy blue |

EXAMPLE 25

Each trisazo compound described in Examples 23 and 24 (each 0.1, 0.3 and 0.6 part) was dissolved in water (200 parts), and sodium sulfate (10 parts) and cotton (10 parts) were added thereto. The bath was heated to 60° C, and then sodium carbonate (4 parts) was added thereto. Dyeing was continued for 1 hour at that temperature. Thereafter, the cotton was removed and washed with water, soaped, washed with water and then dried to obtain each dyed product of a navy blue color superior in fastness properties with a superior build-up property.

EXAMPLE 26

Using each trisazo compound described in Examples 23 and 24, color pastes having the following composition were prepared.

| | |
|---|---|
| Trisazo compound | 5 Parts |
| Urea | 5 Parts |
| Sodium alginate (5%) stock paste | 50 Parts |
| Hot water | 25 Parts |
| Sodium hydrogencarbonate | 2 Parts |
| Water (balance) | 13 Parts |

Mercerized cotton broad cloth was printed with the color pastes of the above composition, pre-dried, steamed at 100° C. for 5 minutes, washed with hot water, soaped, again washed with hot water, and then dried to obtain a product printed in a navy blue color superior in various fastness properties.

We claim:

1. A polyazo compound of the following formula,

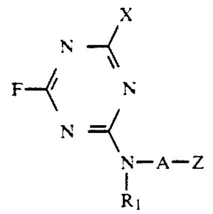

wherein

A is phenylene which is unsubstituted or substituted once or twice by methyl, ethyl, methoxy, ethoxy, chloro, bromo or sulfo, naphthylene which is unsubstituted or substituted by sulfo, or alkylene which is selected from the group consisting of:

—$CH_2$—(alk)—**** (with R' on alk) (a)

—$CH_2)_n$—O—$(CH_2)_m$—**** (b)

and

—(alk')—N—(alk')—**** (with R'' on N) (c)

wherein the linkage **** bonds to the —N—, alk is polymethylene having 1 to 6 carbon atoms or its branched isomer, R' is hydrogen, chloro, bromo, fluoro, hydroxy, sulfato, $C_1$-$C_4$ acyloxy, cyano, carboxy, $C_1$-$C_5$ alkoxycarbonyl or carbamoyl, R'' is hydrogen or $C_1$-$C_6$ alkyl, each alk' is independently polymethylene having 2 to 6 carbon atoms or its branched isomer, or each alk' is taken together with R'' to form a ring through methylene, and m and n are each independently an integer of 1to 6, X is —$NR_2R_3$, —$OR_4$ or —$SR_5$ in which $R_2$, $R_3$, $R_4$ and $R_5$ independently of one another are each hydrogen, $C_1$-$C_4$ alkyl which is unsubstituted or substituted once or twice by $C_1$-$C_4$ alkoxy, sulfo, carboxy, hydroxy, chloro, phenyl or sulfato, phenyl which is unsubstituted or substituted once or twice by $C_1$-$C_4$ alkyl, $C_1$-$C_4$ alkoxy, sulfo, carboxy, chloro or bromo, naphthyl which is unsubstituted or substituted once, twice or thrice by hydroxy, carboxy, sulfo, $C_1$-$C_4$ alkyl, $C_1$-$C_4$ alkoxy or chloro or benzyl which is unsubstituted or substituted once or twice by $C_1$-$C_4$ alkyl, $C_1$-$C_4$ alkoxy, sulfo or chloro, Z is —$SO_2CH{=}CH_2$ or —$SO_2CH_2CH_2Z'$ in which Z' is a group capable of being split by the action of an alkali, $R_1$ is hydrogen or $C_1$-$C_4$ alkyl which is unsubstituted or substituted by hydroxy, cyano, $C_1$-$C_4$ alkoxy, halogen, carboxy, carbamoyl, $C_1$-$C_4$ alkoxycarbonyl, $C_1$-$C_4$ alkylcarbanoyloxy, sulfo or sulfamoyl, and F is a polyazo dye moiety selected from the group consisting of those represented by the following formulas (1), (2), (3) and (4) each in free acid form, the formula (1) being

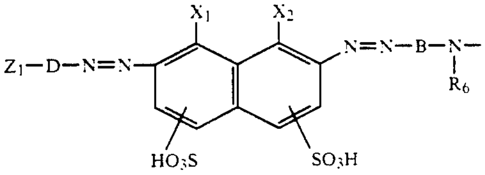

(1)

wherein B is

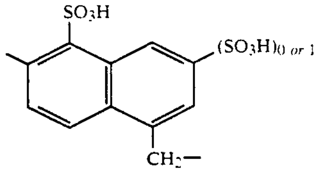

or

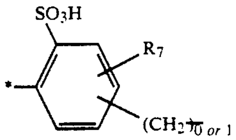

in which the asterisked linkage bonds to the azo group, and $R_7$ is hydrogen, methyl, methoxy or sulfo, D is phenylene which is unsubstituted or substituted once or twice by methyl, ethyl, methoxy, ethoxy, chloro, bromo or sulfo or naphthalene which is unsubstituted or substituted by sulfo, $R_6$ is hydrogen or $C_1$-$C_4$ alkyl which is unsubstituted or substituted by hydroxy, cyano, $C_1$-$C_4$ alkoxy, halogen, carboxy, carbamoyl, $C_1$-$C_4$ alkoxycarbonyl, $C_1$-$C_4$alkylcarbonyloxy, sulfo or sulfamoyl, any one of $X_1$ and $X_2$ is —$NH_2$ and the other is —OH, and $Z_1$ is —$SO_2CH=CH_2$ or —$SO_2CH_2CH_2Z_1'$ in which $Z_1'$ is a group capable of being split by the action of an alkali, the formula (2) being

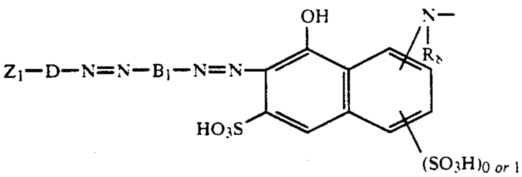

(2)

wherein D and $Z_1$ are as defined above, $R_8$ is hydrogen or $C_1$–$C_4$ alkyl which is unsubstituted or substituted by hydroxy, cyano, $C_1$–$C_4$ alkoxy, halogen, carboxy, carbamoyl, $C_1$–$C_4$ alkoxycarbonyl, $C_1$–$C_4$ alkylcarbonyloxy, sulfur or sulfamoyl, $B_1$ is

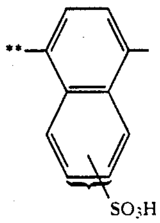

or

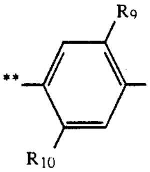

in which the linkage marked as ** bonds to the group —N=N—D, $R_9$ is hydrogen, $C_1$–$C_4$ alkyl, $C_1$–$C_4$ alkoxy or sulfo, and $R_{10}$ is hydrogen, halogen, $C_1$–$C_4$ alkyl, $C_1$–$C_4$ alkoxy, $C_1$–$C_4$ alkylsulfonylamino, $C_1$–$C_4$ acylamino or ureido, the formula (3) being

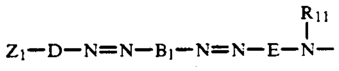

(3)

wherein $B_1$, D and $Z_1$ are as defined above, $R_{11}$ is hydrogen or $C_1$–$C_4$ alkyl which is unsubstituted or substituted by hydroxy, cyano, $C_1$–$C_4$ alkoxy, halogen, carboxy, carbamoyl, $C_1$–$C_4$ alkoxycarbonyl, $C_1$–$C_4$ alkylcarbonyloxy, sulfo or sulfamoyl, E is

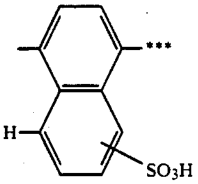

-continued or

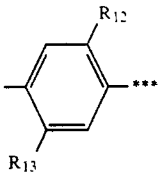

in which the linkage marked with *** bonds to the group

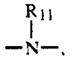

$R_{12}$ is hydrogen, halogen, $C_1$–$C_4$ alkyl, $C_1$–$C_4$ alkoxy or sulfo, and $R_{13}$ is hydrogen, halogen, $C_1$–$C_4$ alkyl, $C_1$–$C_4$ alkylsulfonylamino, $C_1$–$C_4$ alkoxy, $C_1$–$C_4$ acylamino or uriedo, and the formula (4) being

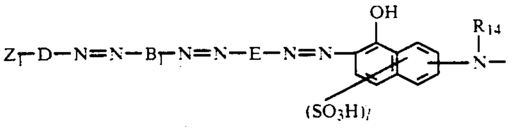

(4)

wherein $B_1$, D and $Z_1$ are as defined above, and E is as defined above, provided that the linkage marked with *** bonds to the azo group of

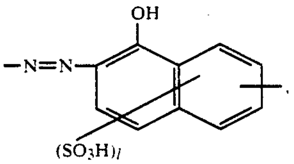

$R_{14}$ is hydrogen, $C_1$–$C_4$ alkyl which is unsubstituted or substituted by hydroxy, cyano, $C_1$–$C_4$ alkoxy, halogen, carboxy, carbamoyl, $C_1$–$C_4$ alkoxycarbonyl, $C_1$–$C_4$ alkylcarbonyloxy, sulfo or sulfamoyl, and l is 1 or 2, provided that $R_4$ is alkyl, phenyl, naphthyl or benzyl as defined above, when F is a polyazo dye moiety of formula (1) or (2).

2. The polyazo compound according to claim 1, wherein the polyazo dye moiety is represented by the formula (1) as defined in claim 1.

3. The polyazo compound according to claim 2, wherein D is phenylene which is unsubstituted or substituted once or twice by methyl, ethyl, methoxy, ethoxy, chloro, bromo or sulfo or naphthalene which is unsubstituted or substituted by sulfo, $R_6$ is hydrogen, and B is

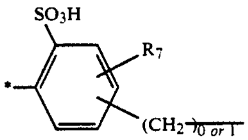

in which the asterisked linkage bonds to the azo group, and $R_7$ is hydrogen, methyl, methoxy or sulfo.

4. The polyazo compound according to claim 2, wherein the polyazo dye moiety is represented by the following formula in the free acid form,

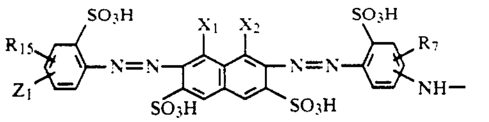

wherein $R_7$ is hydrogen, methyl, methoxy or sulfo, any of $X_1$ and $X_2$ is —$NH_2$ and the other is —OH, $Z_1$ is —$SO_2CH{=}CH_2$ or —$SO_2CH_2CH_2Z_1'$, in which $Z_1'$ is a group capable of being split by the action of an alkali and $R_{15}$ is hydrogen, $C_1$–$C_4$ alkyl, $C_1$–$C_4$ alkoxy, halogen or sulfo.

5. The polyazo compound according to claim 2, wherein the polyazo dye moiety is represented by the following formula in the free acid form,

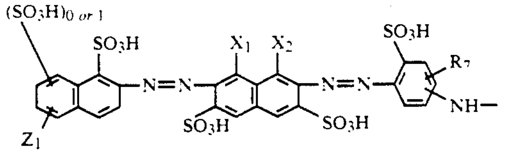

wherein $R_7$ is hydrogen, methyl, methoxy or sulfo, any of $X_1$ and $X_2$ is —$NH_2$ and the other is —OH, and $Z_1$ is —$SO_2CH{=}CH_2$ or —$SO_2CH_2CH_2Z_1'$, in which $Z_1'$ is a group capable of being split by the action of an alkali.

6. The polyazo compound according to claim 1, wherein the polyazo dye moiety is represented by the formula (2) as defined in claim 1.

7. The polyazo compound according to claim 6, wherein $B_1$ is

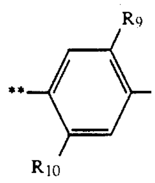

in which the linkage marked with  is as defined in claim 1**, $R_9$ is hydrogen, $C_1$–$C_4$ alkyl, $C_1$–$C_4$ alkoxy or sulfo, and $R_{10}$ is hydrogen, chloro, $C_1$–$C_4$ alkyl, $C_1$–$C_4$ alkoxy, ureido, $C_1$–$C_4$ acylamino or $C_1$–$C_4$ alkylsulfonylamino.

8. The polyazo compound according to claim 1, wherein the polyazo dye moiety is represented by the formula (3) as defined in claim 1.

9. The polyazo compound according to claim 8, wherein $B_1$ is

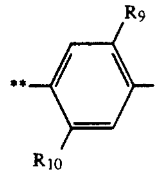

in which the linkage marked with  is defined in claim 1**, $R_9$ is hydrogen, $C_1$–$C_4$ alkyl, $C_1$–$C_4$ alkoxy or sulfo, and $R_{10}$ is hydrogen, chloro, $C_1$–$C_4$ alkyl, $C_1$–$C_4$ alkoxy, ureido, $C_1$–$C_4$ acylamino or $C_1$–$C_4$ alkylsulfonylamino.

10. The polyazo compound according to claim 8, wherein E is

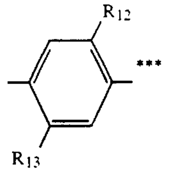

in which the linkage marked with * is as defined in claim 1**, $R_{12}$ is hydrogen, $C_1$–$C_4$ alkyl, $C_1$–$C_4$ alkoxy or sulfo, and $R_{13}$ is hydrogen, chloro, $C_1$–$C_4$ alkyl, $C_1$–$C_4$ alkoxy, ureido, $C_1$–$C_4$ acylamino or $C_1$–$C_4$ alkylsulfonylamino.

11. The polyazo compound according to claim 1, wherein the polyazo dye moiety is represented by the formula (4) as defined in claim 1.

12. The polyazo compound according to claim 11, wherein $B_1$ is

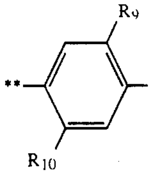

in which the linkage marked with  is as defined in claim 1**, $R_9$ is hydrogen, $C_1$–$C_4$ alkyl, $C_1$–$C_4$ alkoxy or sulfo, and $R_{10}$ is hydrogen, chloro, $C_1$–$C_4$ alkyl, $C_1$–$C_4$ alkoxy, ureido, $C_1$–$C_4$ acylamino or $C_1$–$C_4$ alkylsulfonylamino.

13. The polyazo compound according to claim 11, wherein E is

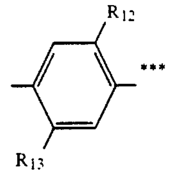

in which the linkage marked with * is as defined in claim 1**, $R_{12}$ is hydrogen, $C_1$–$C_4$ alkyl, $C_1$–$C_4$ alkoxy or sulfo, and $R_{13}$ is hydrogen, chloro, $C_1$–$C_4$ alkyl, $C_1$–$C_4$ alkoxy, ureido, $C_1$–$C_4$ acylamino or $C_1$–$C_4$ alkylsulfonylamino.

14. The polyazo compound according to claim 1, wherein $R_1$ is hydrogen, methyl or ethyl.

15. The polyazo compound according to claim 1, wherein A is phenylene unsubstituted or substituted once or twice by methyl, ethyl, methoxy, ethoxy, chloro, bromo or sulfo, or naphthylene unsubstituted or substituted by sulfo, or —$CH_2CH_2$—, or —$CH_2CH_2OCH_2CH_2$—.

16. The polyazo compound according to claim 1, wherein X is —$NR_2R_3$ in which $R_2$ and $R_3$ independently of one another are each hydrogen, $C_1$–$C_4$ alkyl which is unsubstituted or substituted once or twice by $C_1$–$C_4$ alkoxy, sulfo, carboxy, hydroxy, chloro, phenyl or sulfato or phenyl which is unsubstituted or substituted once or twice by $C_1$–$C_4$ alkyl, $C_1$–$C_4$ alkoxy, sulfo, carboxy, chloro or bromo.

17. The polyazo compound according to claim 1, wherein X is —$OR_4$ in which $R_4$ is $C_1$–$C_4$ alkyl which is unsubstituted or substituted once or twice by $C_1$–$C_4$ alkoxy, sulfo, carboxy, hydroxy, chloro, phenyl or sulfato or phenyl which is unsubstituted or substituted once or twice by $C_1$–$C_4$ alkyl, $C_1$–$C_4$ alkoxy, sulfo, carboxy, chloro or bromo.

* * * * *